US008510173B2

(12) United States Patent  
Myslinski

(10) Patent No.: US 8,510,173 B2  
(45) Date of Patent: Aug. 13, 2013

(54) METHOD OF AND SYSTEM FOR FACT CHECKING EMAIL

(71) Applicant: Lucas J. Myslinski, Sunnyvale, CA (US)

(72) Inventor: Lucas J. Myslinski, Sunnyvale, CA (US)

( * ) Notice: Subject to any disclaimer, the term of this patent is extended or adjusted under 35 U.S.C. 154(b) by 0 days.

(21) Appl. No.: 13/760,408

(22) Filed: Feb. 6, 2013

(65) Prior Publication Data

US 2013/0151641 A1 Jun. 13, 2013

Related U.S. Application Data

(63) Continuation of application No. 13/669,589, filed on Nov. 6, 2012, which is a continuation of application No. 13/528,563, filed on Jun. 20, 2012, now Pat. No. 8,321,295, which is a continuation of application No. 13/448,991, filed on Apr. 17, 2012, now Pat. No. 8,229,795, which is a continuation of application No. 13/287,804, filed on Nov. 2, 2011, now Pat. No. 8,185,448.

(60) Provisional application No. 61/495,776, filed on Jun. 10, 2011.

(51) Int. Cl.
   *G06Q 30/00* (2012.01)
(52) U.S. Cl.
   USPC .......................................................... 705/26.1
(58) Field of Classification Search
   USPC .......................................................... 705/26.1
   See application file for complete search history.

(56) References Cited

U.S. PATENT DOCUMENTS

| | | | |
|---|---|---|---|
| 5,960,411 | A | 9/1999 | Hartman et al. |
| 6,161,090 | A | 12/2000 | Kanevsky et al. |
| 6,266,664 | B1 | 7/2001 | Russell-Falla et al. |
| 6,782,510 | B1 | 8/2004 | Gross et al. |
| 7,249,058 | B2 | 7/2007 | Kim et al. |
| 7,337,462 | B2 | 2/2008 | Dudkiewicz et al. |
| 7,478,078 | B2 | 1/2009 | Lunt et al. |
| 7,644,088 | B2 | 1/2010 | Fawcett et al. |
| 7,657,424 | B2 | 2/2010 | Bennett |
| 7,765,574 | B1 | 7/2010 | Maybury et al. |
| 2002/0083468 | A1 | 6/2002 | Dudkiewicz |
| 2003/0158872 | A1 | 8/2003 | Adams |
| 2003/0210249 | A1 | 11/2003 | Simske |
| 2004/0103032 | A1 | 5/2004 | Maggio |
| 2004/0122846 | A1 | 6/2004 | Chess et al. |
| 2004/0139077 | A1 | 7/2004 | Banker |

(Continued)

FOREIGN PATENT DOCUMENTS

| | | |
|---|---|---|
| GB | 2428529 A | 1/2007 |
| WO | 0177906 A2 | 10/2001 |

(Continued)

OTHER PUBLICATIONS

Notice of Allowance including reasons for allowance from U.S. Appl. No. 13/669,711.

(Continued)

*Primary Examiner* — Mila Airapetian  
(74) *Attorney, Agent, or Firm* — Haverstock & Owens LLP

(57) ABSTRACT

A fact checking system verifies the correctness of information and/or characterizes the information by comparing the information with one or more sources. The fact checking system automatically monitors, processes, fact checks information and indicates a status of the information.

20 Claims, 9 Drawing Sheets

(56) References Cited

U.S. PATENT DOCUMENTS

| | | |
|---|---|---|
| 2004/0210824 A1 | 10/2004 | Shoff et al. |
| 2005/0022252 A1 | 1/2005 | Shen |
| 2005/0060312 A1 | 3/2005 | Curtiss et al. |
| 2005/0120391 A1 | 6/2005 | Haynie et al. |
| 2005/0132420 A1* | 6/2005 | Howard et al. ............... 725/135 |
| 2005/0235199 A1 | 10/2005 | Adams |
| 2006/0015904 A1 | 1/2006 | Marcus |
| 2006/0064633 A1 | 3/2006 | Adams |
| 2006/0206912 A1 | 9/2006 | Klarfeld et al. |
| 2006/0212904 A1 | 9/2006 | Klarfeld et al. |
| 2006/0248076 A1 | 11/2006 | Troy et al. |
| 2007/0011710 A1 | 1/2007 | Chiu |
| 2007/0043766 A1 | 2/2007 | Nicholas et al. |
| 2007/0136781 A1 | 6/2007 | Kawai |
| 2007/0136782 A1 | 6/2007 | Ramaswamy et al. |
| 2007/0288978 A1 | 12/2007 | Pizzurro et al. |
| 2008/0109780 A1 | 5/2008 | Stern et al. |
| 2008/0319744 A1 | 12/2008 | Goldberg |
| 2009/0210395 A1 | 8/2009 | Sedam |
| 2009/0265304 A1 | 10/2009 | Ait-Mokhtar et al. |
| 2010/0121638 A1 | 5/2010 | Pinson et al. |
| 2010/0121973 A1 | 5/2010 | Lobacheva et al. |
| 2010/0235313 A1 | 9/2010 | Rea et al. |
| 2011/0043652 A1 | 2/2011 | King et al. |
| 2011/0066587 A1 | 3/2011 | Ferrucci et al. |
| 2011/0067065 A1 | 3/2011 | Karaoguz et al. |
| 2011/0087639 A1 | 4/2011 | Gurney |
| 2011/0093258 A1 | 4/2011 | Xu et al. |
| 2011/0106615 A1 | 5/2011 | Churchill et al. |
| 2011/0136542 A1 | 6/2011 | Sathish |
| 2011/0166860 A1 | 7/2011 | Tran |
| 2011/0313757 A1 | 12/2011 | Hoover et al. |

FOREIGN PATENT DOCUMENTS

| | | |
|---|---|---|
| WO | 0177907 A2 | 10/2001 |
| WO | 03014949 A1 | 2/2003 |
| WO | 2004034755 A2 | 4/2004 |
| WO | 2006036853 A2 | 6/2006 |
| WO | 2007115224 A2 | 10/2007 |
| WO | 2009006542 A2 | 1/2009 |
| WO | 2009089116 | 7/2009 |
| WO | 2010093510 A1 | 8/2010 |
| WO | 2010105245 A2 | 9/2010 |
| WO | 2011088264 A1 | 7/2011 |

OTHER PUBLICATIONS

Office Action from U.S. Appl. No. 13/669,711.
Office Action from U.S. Appl. No. 13/669,819.
Notice of Allowance including reasons for allowance from U.S. Appl. No. 13/669,819.
Ulken, A Question of Balance: Are Google News search results politically biased? May 5, 2005, <http://ulken.com/thesis/googlenews-bias-study.pdf>.
<http://jayrosen.posterous.com/my-simple-fix-for-the-messed-up-sunday-shows>, Dec. 27, 2009.
<http://en.wikipedia.org/wiki/SpinSpotter>, Jul. 1, 2010.
Notice of Allowance including reasons for allowance from U.S. Appl. No. 13/632,490.
Notice of Allowance including reasons for allowance from U.S. Appl. No. 13/287,804.
Accelerated Examination Support Document from U.S. Appl. No. 13/287,804.
Preexam Search Document from U.S. Appl. No. 13/287,804.
Wendell Cochran; Journalists aren't frauds; the business has fine lines; Ethics classes would help them stay on right side; The Sun. Baltimore, Md.: Jul. 19, 1998. p. 6.C; http://proquest.umi.com/pqdweb?did=32341381&sid=3&Fmt=3&clientId=19649&RQT=309&VName=PQD.
Notice of Allowance including reasons for allowance from U.S. Appl. No. 13/448,991.
http://en.wikipedia.org/wiki/Fantasy_football_(American), Jul. 30, 2012.
Notice of Allowance including reasons for allowance from U.S. Appl. No. 13/528,563.

* cited by examiner

| | | | |
|---|---|---|---|
| Word Processing 200 | Advertising 202 | Entity Validity Rating 204 | Source Rating 206 |
| Flagging 208 | Voice/Facial/Biom. Recognition 210 | Self-Checking 212 | Learning 214 |
| Auto-correction 216 | Search Engine 218 | Audio/Video/Text 220 | Translator 222 |
| Email/IM/Twitter/ Text 224 | Item Determination 226 | Media Analysis 228 | Re-Broadcast 230 |
| Supplemental Information 232 | Action 234 | Opposing Arguments 236 | Parallel 238 |
| Importance 240 | Medical 242 | | |

Figure 2

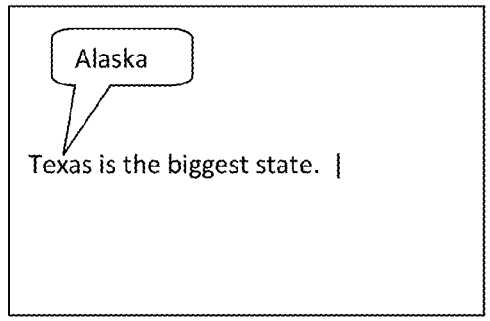
300
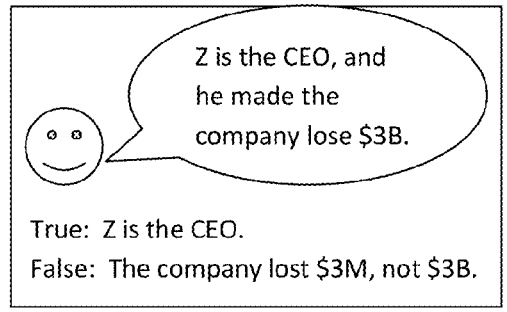
302
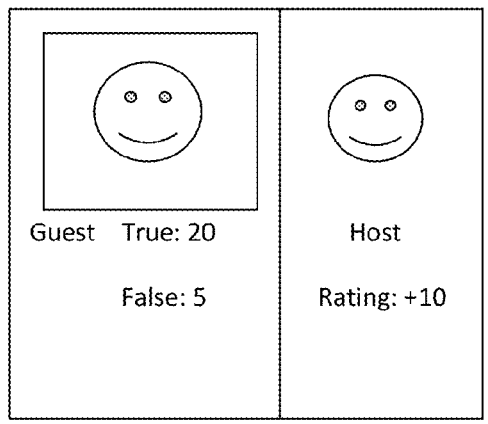
304
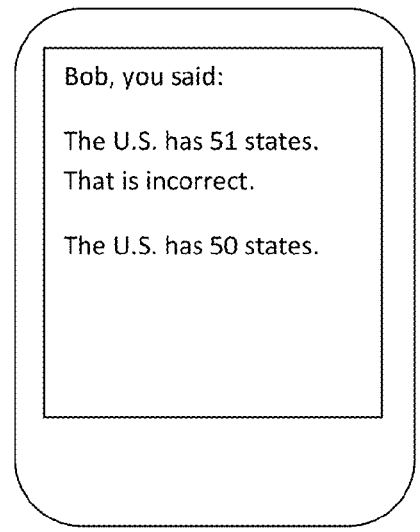
306
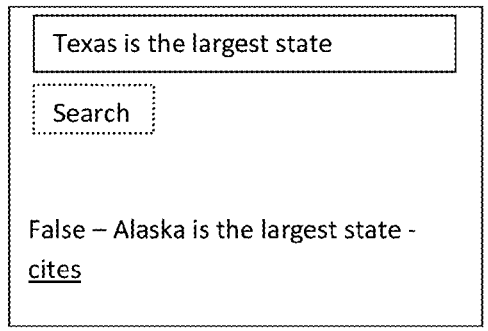
308
Figure 3

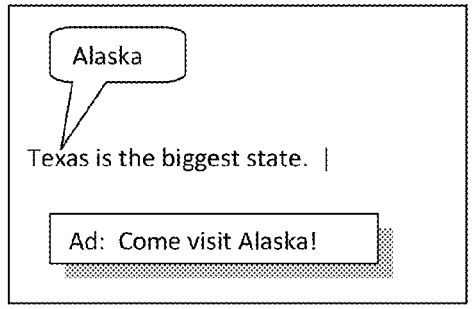
600
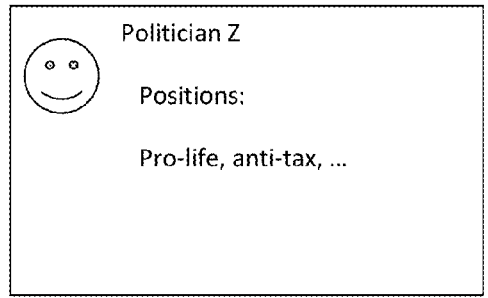
604
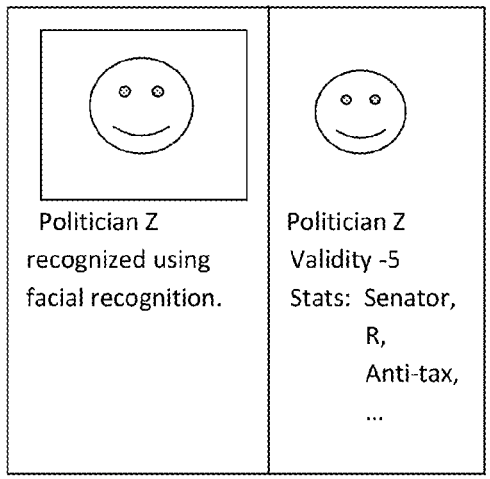
602
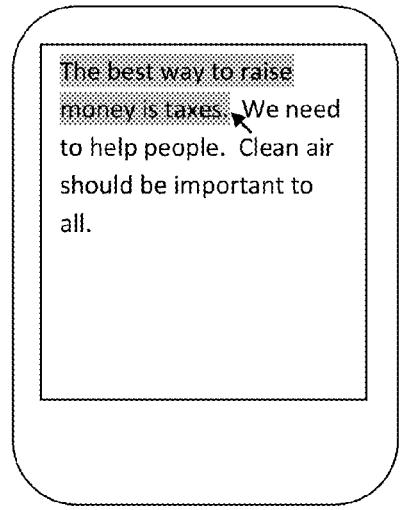
606
Figure 6

Source 1   100%
Source 2   100%
Source 3   99%
Source 4   98%
...
---Threshold---
...
Source N   0%
Figure 7
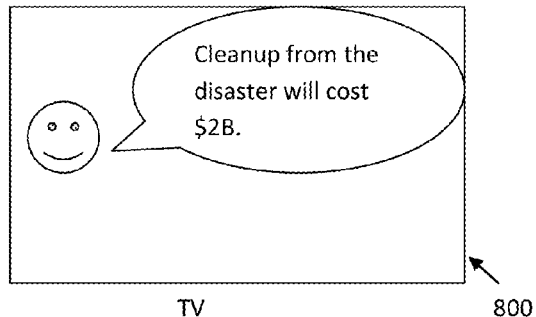
TV                              800
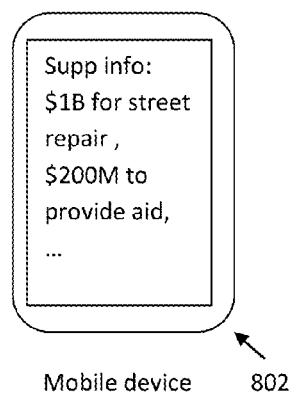
Mobile device   802
Figure 8
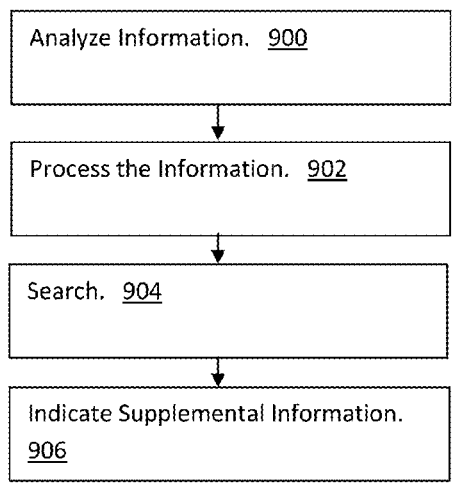
Figure 9

| Argument | Counter Argument |
|---|---|
| +Pro-Globalization | +Anti-Globalization |
| +Increased profits | +Lost US Jobs |
| +$5B profits in 2010 vs. $1B in 2000 | +US Unemployment at 10% |
| ... | ... |

Figure 10

| Brand X | Brand Y |
|---|---|
| ... | ... |

Figure 11

| User Selection/Info | Keywords | ... | Advertisement |
|---|---|---|---|
| Liberal, Environmental | Global Warming, Pollution, ... | ... | Hybrid X Vehicle |
| Conservative, Gun Owner | Second Amendment, Gun Control, ... | ... | Machine Gun Z |
| ... | | | |

Figure 12

*News Page Headlines*

President Plans to Cut Taxes     5

EPA to Enforce New Regulations     10

XYZ Corporation has $200M loss in Q3     2

Figure 13

METHOD OF AND SYSTEM FOR FACT CHECKING EMAIL

CROSS-REFERENCE TO RELATED APPLICATION(S)

This application is a continuation application of U.S. patent application Ser. No. 13/669,589, filed on Nov. 6, 2012, and titled "METHOD OF AND SYSTEM FOR PARALLEL FACT CHECKING" which is a continuation application of U.S. Pat. No. 8,321,295, filed on Jun. 20, 2012, and titled "FACT CHECKING METHOD AND SYSTEM" which is a continuation application of U.S. Pat. No. 8,229,795, filed on Apr. 17, 2012, and titled "FACT CHECKING METHODS" which is a continuation application of U.S. Pat. No. 8,185,448, filed on Nov. 2, 2011, and titled "FACT CHECKING METHOD AND SYSTEM" which claims the benefit of U.S. Provisional Patent Application Ser. No. 61/495,776, filed Jun. 10, 2011, and titled "FACT CHECKING METHOD AND SYSTEM," all of which are hereby incorporated by reference in their entireties for all purposes.

FIELD OF THE INVENTION

The present invention relates to the field of information analysis. More specifically, the present invention relates to the field of automatically verifying the factual correctness of a statement.

BACKGROUND OF THE INVENTION

Information is easily dispersed through the Internet, television and many other outlets. One major problem is that the information dispersed is often not correct. Although there are fact checking websites available online, these websites check facts in a slow manner; typically not truly providing a fact check response for several hours or even days.

SUMMARY OF THE INVENTION

A fact checking system verifies the correctness of information and/or characterizes the information by comparing the information with one or more sources. The fact checking system automatically monitors, processes, fact checks information and indicates a status of the information.

The fact checking system includes many embodiments, some of which are summarized herein. The fact checking system is able to be used to provide supplemental information, for example, information regarding a communication, information about a person or other entity, advertisements, opposing advertisements, information about a user, information about an item, media analysis, commercial analysis, bias classification, a follow-up question for a host, arguments and opposing arguments, and information based on the importance to a user.

The fact checking system is able to be implemented using rated sources, classified sources, a recognition system, learning, context determination, auto-correction, parallel computing and/or many other features.

The fact checking system will provide users with vastly increased knowledge, limit the dissemination of misleading or incorrect information, provide increased revenue streams for content providers, increase advertising opportunities, and support many other advantages.

BRIEF DESCRIPTION OF THE DRAWINGS

FIG. 2 illustrates a block diagram of various implementations of fact checking according to some embodiments.

FIG. 3 illustrates exemplary screenshots of various implementations of fact checking according to some embodiments.

FIG. 6 illustrates exemplary implementations according to some embodiments.

FIG. 7 illustrates exemplary source ordering according to some embodiments.

FIG. 8 illustrates an example of providing supplemental information based on information from a television where the supplemental information is displayed on a user's mobile device according to some embodiments.

FIG. 9 illustrates a flowchart of a method of providing additional or supplemental information according to some embodiments.

FIG. 10 illustrates an exemplary table of arguments and counter arguments according to some embodiments.

FIG. 11 illustrates an exemplary table of brands according to some embodiments.

FIG. 12 illustrates an exemplary data structure implementing selections and advertising according to some embodiments.

FIG. 13 illustrates an exemplary listing of headlines with an importance rating according to some embodiments.

DETAILED DESCRIPTION OF THE PREFERRED EMBODIMENT

Figure 1:
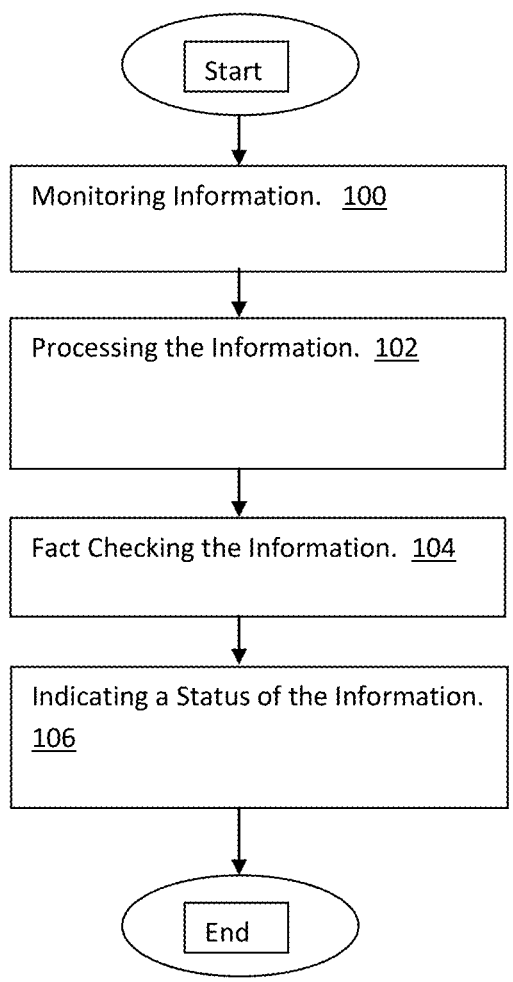
FIG. 1 illustrates a flowchart of a method of implementing fact checking according to some embodiments of the present invention.

A fact checking system verifies the correctness or accuracy of information by comparing the information with one or more sources. Although the phrase "fact checking" is used, any sort of information analysis is to be understood (e.g. determining a phrase is "spin" or sarcasm).

Monitoring

The fact checking system monitors any information including, but not limited to, text, video, audio, verbal communications or any other form of communication. Communications include, but are not limited to email, word processing documents, Twitter (tweets), message boards, web pages including, but not limited to, Facebook® postings and web logs, any computing device communication, telephone calls, television audio, video or text, other text, radio, television broadcasts/shows, radio broadcasts, face-to-face conversations, VoIP calls (e.g. Skype™), video conferencing, live speech and any other communication that is able to be analyzed. In some embodiments, monitoring includes recording, scanning or any other type of monitoring. In some embodiments, monitoring also includes capturing and/or transmitting the data. In some embodiments, monitoring includes determining if a portion of the information is fact checkable.

Processing

To perform fact checking, the monitored information is processed including, but not limited to, transmitted, converted, parsed, formatted, analyzed and reconfigured using context determination and/or any other processing. For example, voice data is converted to text, screen text is converted to usable text, graphics are converted to a usable form of data, or any other data conversion is able to be implemented to enable fact checking. For some types of monitored information, little, if any, processing is performed. For example, text which is already properly formatted is able to be fact checked without any conversion. In another example, when comparing audio to searchable audio records conversion may not be needed. In some embodiments, processing also includes capturing and/or transmitting the data. Formatting is able to include changing the order of words deleting unnecessary words and/or any other formatting to enable the information to be searched.

Verification/Fact Checking

The information including, but not limited to, phrases, segments, numbers, words, comments, values, graphics or any other data is analyzed or verified using the fact checking system. In some embodiments, a phrase is first located or determined, and then it is analyzed. The verification or fact checking process compares the data to be verified with data from one or more sources. In some embodiments, the sources are web pages on the Internet, one or more databases, one or more data stores and/or any other source. In some embodiments, the source is a personal source including, but not limited to, an online log or diary.

In some embodiments, the data verification or fact checking is a straight text comparison, and in some embodiments, another implementation including, but not limited to, natural language, context/contextual comparison or intelligent comparison is used. In some embodiments, a combination of search implementations is used.

An example of a straight text comparison is comparing the phrase, "Texas is the largest state" with text to find "Texas is the largest state." When the text is not found because Alaska is the largest state, a result of false is returned. An example of a context comparison is: "Texas is the largest state" where a list of states by size is found, and Texas is located in the list; when Texas is not #1, a result of false is returned, or the location in the list is returned, e.g. #2. In another example of context comparison: "Texas is the largest state," the land mass of Texas is compared with land masses of the other 49 states, and since Texas does not have the largest land mass, the result is false. An example of an intelligent comparison is: X criticizes Y because Y had an affair, then the intelligent comparison locates a story that indicates X had an affair two years ago. An indication of hypocrisy by X is presented.

In some embodiments, previously checked facts are stored (e.g. in a database on a server) to prevent the perpetration of a false statement or story, or other characterization. In some embodiments, the facts are first checked manually or automatically which is able to occur in real-time or non-real-time, but then when a repeat occurrence happens, the results of that fact check occurs in real-time. For example, a story that Candidate X is a communist is presented by one commentator. The story is fact checked, and the result of the fact check (e.g. not true) is stored, including the original comment and any context related. Then, when another commentator or anyone else says, "Candidate X is a communist," the fact checker uses the previously stored result to immediately inform a viewer/user that the story is not true. Thus, commentators and others will not bother perpetuating a false story as they will not only be proven wrong immediately but will also damage their credibility.

In some embodiments, the sources are rated using a rating system so that sources that provide false or inaccurate information are rated as poor or unreliable and/or are not used, and sources that rarely provide misinformation are rated as reliable and are used and/or given more weight than others. For example, if a source's rating falls or is below a threshold, that source is not used in fact checking. In some embodiments, users are able to designate the threshold. For example, a user specifies to fact check using only sources with an "A" rating or higher. In some embodiments, sources' ratings are available or shown to users. In some embodiments, users are able to rate sources. In some embodiments, sources are rated based on previous fact checking results to determine computer-generated ratings. For example, if a source is proven wrong by comparing the data with other sources or the results with other sources' results, that source would be rated as poor. For further example, Source X indicates that Z is true, but twenty other reliable sources indicate that Z is false. Such a result would affect Source X's reliability rating negatively. Examples of very reliable sources include a dictionary and an encyclopedia. An example of a potentially very unreliable source includes a biased, opinion web log that fabricates stories. In some embodiments, an impartial group or organization rates the sources, or any other method of rating the sources is used. In some embodiments, sources are reviewed by an agency (e.g. an independent rating agency) to obtain a reliability rating. In some embodiments, a combination of user ratings, computer ratings and/or other ratings is implemented. In some embodiments, there are separate classes of ratings or reviews including, but not limited to, general users, experts, friends, co-workers, news organizations or any other groups. The rating system is able to be numeric including, but not limited to, 1-10, by grades including, but not limited to A-F or any other rating or grading system. Furthermore, the rating system is able to be incorporated into a mathematical equation to provide higher quality results. For example, if a statement is being verified, and two different sets of results are found such that one set of results verifies the statement as fact and the other set verifies the statement as fiction, the one from the higher rated sources is selected. A sample equation is:

Source Result Value=Number of Sources*Average Rating of Sources, where the search path with highest Source Result Value determines the verification result. For example, "Person X is running for president," results in 10 sources with an average rating of 9 (where 1 is untrustworthy and 10 is very trustworthy) saying "True," and 20 sources with an average rating of 2 saying "False," the result would be "True" since (10*9)=90 is greater than (20*2)=40. Another sample equation is: Source Result Value=(Source Rating1+Source Rating2+ . . . Source Rating)/number of sources.

In some embodiments, the sources are classified in one or more classifications including, but not limited to, comedy, opinion, fact, fiction, and/or political. Any other classifications, groupings, sub-classifications, and/or sub-groupings are possible. In some embodiments, sources are rated in political terms including, but not limited to, independent, ultra-liberal, leaning left, neutral/moderate, leaning right, ultra-conservative, green, and libertarian.

In some embodiments, a user is able to customize which sources are used and/or not used. For example, if a user believes Source Z provides inaccurate information, the user is able to mark that source so that it is not used. In some embodiments, sources are clustered, so that a user is able to select a cluster instead of individual sources. For example, a user is able to select to use all dictionary and encyclopedic references. In some embodiments, a user is able to select sources based on characteristics including, but not limited to, a political characterization (e.g. conservative). Any other user selection or exclusion of sources is possible.

In some embodiments, a phrase to be fact checked may not have an exact answer, the answer may not be known at the time, or the fact checking system may not be able to find the answer. If this occurs, a "best guess" is able to be selected and presented. In some embodiments, each result from a source that is checked is able to include a result accuracy rating. For example, if a fact to be checked is, "the U.S. has 50 states," many sources should return a 100% accuracy rating for the result since it is easily searched for and determined within the sources. However, if a fact to be checked is not easily determined, the results may be less than 100% accurate and could therefore be labeled as a "best guess" including a confidence/accuracy/certainty percentage, instead of a fact.

In some embodiments, for example, where the facts are not certain, a collective determination system is used. For example, a determination that 40 sources (e.g. sites) agree with the statement and 5 disagree, allows the user to make a judgment call and look further into the statement.

In some embodiments, where a subjective statement is made or asked, ratings, objective information, and/or subjective information is located to determine the accuracy of the statement or question. For example, if a person says, "Star Wars is better than Star Trek," ratings information giving Star Wars an 8.5 and Star Trek and 8.0 would verify the validity of the statement, and the fact checker would return the statement "True." The ratings information is able to be any ratings information including, but not limited to, user ratings, critic ratings, other ratings or a combination thereof. In some embodiments, if an opinion is detected (e.g. by recognizing, "in my opinion," "I think" or another opinion phrase), the statement is not ruled as valid or invalid, but supporting information is able to be detected and presented (e.g. 10 sites agree with your opinion and 5 disagree). In some embodiments, if an opinion without basis/justification is detected, an indication of "unfounded opinion" is indicated or the basis is presented. In some embodiments, pros and cons of each are provided so that the user is able to make the determination of which is better. In some embodiments, when a user submits a subjective item, one or more results are presented that answer the subjective item. For example, if a user searches using a search engine for "the best restaurant in San Francisco," a single restaurant is presented which has the highest rating for restaurants in San Francisco. In some embodiments, since there are several rating agencies/sites, multiple restaurants are presented, and a description such as "highest rated by X" is presented next to each result. For example, Restaurant X is highest rated by source A, Restaurant Y is highest rated by source B and Restaurant Z is highest rated by source C. In some embodiments, all of the rating agencies/sites are compared, and a single entity is presented. For example, if there are 10 sites that rate songs, and 8 agree that Song J is the best ever, while 2 agree that Song L is the best ever, Song J is presented as the best song ever. In some embodiments, users are able to select how they want the results presented including, one ultimate result, a list of results, a graph of results, and/or any other presentation.

In some embodiments, context determination is used such that the context of the comment is checked in determining the validity of the comment. For example, if someone says, "he wasted billions of dollars," the "he" is determined based on additional context surrounding the statement. In another example, the question is also analyzed to determine if the response is valid. For instance, if a question asks, "Did you receive any money illegally?," and a respondent answers, "I have not been convicted of a crime," that comment is able to be flagged as "spin," "unresponsive," "questionable" or the like, since technically the answer to the question is true, but the point of the question has not really been answered. Other forms of context checking are able to be implemented as well to provide more information to the viewer. In some embodiments, when "spin," a nonresponsive response or any sort of questionable response is detected, a host is notified, so that he is able to press the issue. For example, a television show host asks a guest if the guest has ever "cheated on his taxes," and the guest responds with, "I have never been convicted of tax fraud." A yellow light is displayed to signal the host to ask the question in a different manner or further press the issue to try to get to the truth. As described herein, in some embodiments, an additional question is automatically presented (e.g. on a teleprompter or in his earpiece), so that the host does not have to formulate the additional question. In some embodiments, a follow-up question is presented to the host after every response by the guest. In some embodiments, the question is based on the guest's answer.

Context is able to be used in many ways to find an answer. For example, if Person A says Person B is biased, there may not be an exact statement to be found that says, "Person B is biased." However, using context, biased quotes, pictures, stories, audio, video or other data may be found from Person B which would indicate he is biased. Additionally, when there may be a gray area such as someone being biased, both sides are able to be found and presented for the viewer to determine the truth. For example, audio with Person B denigrating a specific group would indicate bias, but video of that same person helping that specific group would indicate non-bias or a change of view.

In some embodiments, hyperbole, sarcasm, comedy and other linguistic styles are checked and/or detected, and the information is indicated as such. Detection occurs using any contextual qualities including, but not limited to, the tone, the channel/station/type of website (e.g. a news channel), and/or type of person (e.g. comedian).

In some embodiments, causation is analyzed and fact checked. For example, if Z makes the statements, "A is Russian, Russia in the past was communist, therefore A is a communist," an indication that the causation is weak is presented. Weights of causation are able to be indicated including, but not limited to, weak causation, strong causation or a number rating including, but not limited to, 1 through 10. In some embodiments, causation is able to be analyzed by determining links between items, and the greater the number of links and/or the severity of the links, the greater the causation. Where causation is difficult to analyze and/or establish, an alert questioning causation is indicated. For example, if a commentator makes the statement that prices of goods went up in the under President Z, if there is insufficient data to indicate that the prices went up because of actions President Z took, an indication of "questionable causation" is able to be presented. In some embodiments, causation (or lack thereof) is determined by logical flaws or incorrectness. For example, if a commentator makes the claim that President Z harmed businesses by lowering taxes, an indication of "poor causation" is able to be made since it is logically inconsistent for lowering taxes to harm businesses. In some embodiments, sources supporting and/or contradicting the information are displayed. In some embodiments, a list or another description is displayed indicating other possible causes for the result. For example, if a commentator says the economy is in trouble because of the President, a list of other possible causes could be displayed such as Congress, a credit collapse, and others, including percentages next to each indicating percentages based on previous polling.

In some embodiments, when the data verification or fact checking occurs, one or more dedicated sources are used. In some embodiments, one or more non-dedicated sources are used. In some embodiments, a combination of dedicated and non-dedicated sources is used. In some embodiments, the reliability of the data verification depends on the number of sources used. For example, if a story has 5 independent sources that verify the story, then that would be considered and denoted more reliable than a story with 1 source. The reliability of the sources is also able to affect the reliability of the story. For example, although 5 sources verify a story, if the sources are all poorly rated sources in terms of reliability, then that story may be considered less reliable than a story that has 1 very reliable source. In some embodiments, an implementation is used to determine if the same story/article is used more than once as a source. For example, if there is only one source for an article but the same story is posted on ten different websites, in some embodiments, that repetition is recognized and only counts as one verification source.

In some embodiments, a user performs a check of the automatic fact check results.

In some embodiments, checks are performed to ensure sources or source data are not stale, or that stale sources or source data are not used when fact checking. For example, if the statement, "X is running for President" is made regarding the 2016 election, and several sources have data that show X ran for President in 2000, that data is ignored since it does not prove that X is running in the 2016 election. Checking for stale sources and source data is able to be done by comparing a creation date of the data or other characteristics or landmarks of the sources or data or any other manner.

In some embodiments, via social networking, contacts' sources' search results or other related information is used when performing a user's search. For example, a user fact checks the "Tiger is the best golfer," and a contact (e.g. friend) had already done this fact check. The results from that fact check are given to this user. This is able to improve search speed and accuracy.

Indicating Status

After fact checking is performed, an indication or alert is used to indicate/inform/alert a user of a status of the information including, but not limited to, correct/true/valid or incorrect/false/invalid. In addition to correct and incorrect, other gray area indicators are possible including, but not limited to, "unknown," "depending on the circumstances" or "close to the truth." Additionally, any other status indicators are possible. The indicators are able to be any indicators including, but not limited to, lights, sounds, highlighting, text, a text bubble, a scrolling text, color gradient, headnotes/footnotes, an iconic or graphical representation (e.g. a meter, Pinocchio's nose or thumbs up/down), a video or video clip, music, other visual or audio indicators, a projection, a hologram, a tactile indicator including, but not limited to, vibrations, an olfactory indicator, a Tweet, an email, a page, a phone call, or any combination thereof. For example, text is able to be highlighted or the text color is able to change based on the validity of the text. For example, as a user types, the true statements are displayed in green, the questionable statements are displayed in yellow and the false statements are displayed in red. Similarly, when a commentator speaks on a television program, true statements are displayed in a first color and false statements are displayed in a second color. Additional colors or shades of color or brightness of colors are able to be used to indicate other items including, but not limited to, hyperbole, opinions, and other items. In some embodiments, sources to the verification data are provided (e.g. using hyperlinks or citations). In some embodiments, the text itself includes a hyperlink. The source enables the user to verify the statement himself, for example, by reviewing an original source for an article. In some embodiments, a phrase itself is not affected or labeled, but additional information is provided in close proximity. For example, if a politician on a talk show says, "the President raised the deficit by $1T this year," the fact checking system presents data showing the deficit from last year and this year, so that users are able to compare what the politician said and what an independent source said. In some embodiments, indicating includes transmitting and/or broadcasting the indication to one or more devices (e.g. televisions).

In some embodiments, the fact checking system is implemented such that responses, validity determinations and/or indications are available in real-time or near real-time. By real-time, it is meant instantaneously, for example, such that when a politician makes a comment on a political show, within a second or a few seconds, the comment is fact checked, and an indication of the validity of the comment is presented. Furthermore, since the monitoring, processing, fact checking and indicating are all able to be performed automatically without user intervention, real-time also means faster than having a human perform the search and presenting results. Depending on the implementation, in some embodiments, the indication is presented in at most 1 second, at most several seconds (e.g. at most 5 seconds), at most a minute, at most several minutes or by the end of a show. In some embodiments, the time amount (e.g. at most 1 second) begins once a user pauses in typing, once a phrase has been communicated, once a phrase has been determined, at the end of a sentence, once an item is flagged, or another point in a sequence. For example, a commentator makes the comment, "Z is running for President." As soon as that phrase is detected, the fact checker checks the fact, returns a result and displays an indication based on the result in less than 1 second—clearly much faster than a human performing a search, analyzing the search results and then typing a result to be displayed on a screen.

FIG. 1 illustrates a flowchart of a method of implementing fact checking according to some embodiments of the present invention.

In the step 100, information is monitored. In some embodiments, all information is monitored; in some embodiments, only some information is monitored; or in some embodiments, only explicitly selected information is monitored. In some embodiments, although all information is monitored, only some information (e.g. information deemed to be fact-based) is utilized for the fact check analysis. Monitoring is able to be implemented in any manner including, but not limited to, storing or recording the information, transmitting the information, and any other method of monitoring. The information to be monitored is any information including, but not limited to, television audio, video or text, other text, radio, television broadcasts/shows, radio broadcasts, word processing data and/or documents, email, Twitter (tweets), message boards, web pages including, but not limited to, Facebook® postings and web logs, any computing device communication, telephone calls, face-to-face conversations, VoIP calls (e.g. Skype™), video conferencing, live speech and any other information. In some embodiments, monitoring includes, but is not limited to, observing, tracking, collecting, scanning, following, surveying and/or overseeing.

In the step 102, the information is processed. In some embodiments, processing includes converting the information into a searchable format. During or after the information is monitored, the information is converted into a searchable format. Processing is able to include many aspects including, but not limited to, converting audio into text, formatting, parsing data, determining context and/or any other aspect that enables the information to be fact checked. Parsing, for example, includes separating a long speech into separate phrases that are each separately fact checked. For example, a speech may include 100 different facts that should be separately fact checked. In some embodiments, the step 102 is able to be skipped if processing is not necessary (e.g. text in word processor may not need to be processed).

In a more specific example of processing, broadcast information is converted into searchable information (e.g. audio is converted into searchable text), and then the searchable information is parsed into fact checkable portions (e.g. segments of the searchable text; several word phrases). Parsing is able to be implemented in any manner including, but not limited to, based on sentence structure (e.g. subject/verb determination), based on punctuation including, but not limited to, end punctuation of each sentence (e.g. period, question mark, exclamation point), based on search results and/or any other manner. In some embodiments, processing includes, but is not limited to, calculating, computing, storing, recognition, speaker recognition, language (word, phrase, sentence, other) recognition, labeling, and/or characterizing.

In the step 104, the information is fact checked. Fact checking includes comparing the information to one or more sources of information to determine the validity, accuracy, quality, character and/or type of the information. In some embodiments, the comparison is a straight word for word text comparison. In some embodiments, the comparison is a context comparison. In some embodiments, an intelligent comparison is implemented to perform the fact check. Any method of analyzing the source information and/or comparing the information to the source information to analyze and/or characterizing the information is able to be implemented. An example implementation of fact checking includes searching (e.g. a search engine's search), parsing the results or searching through the results of the search, comparing the results with the information to be checked using one or more of the comparisons (e.g. straight text, context or intelligent) and retrieving results based on the comparison. The results are able to be any type including, but not limited to, binary, Boolean (True/False), text, numerical or any other format. In some embodiments, determining context and/or other aspects of converting could be implemented in the step 104. In some embodiments, the sources are rated and/or weighted. Although the phrase "fact checking" is used, any sort of information analysis is to be understood (e.g. determining a phrase is sarcasm).

In the step 106, a status of the information is indicated. The status is indicated in any manner including, but not limited to, transmitting and/or displaying text, highlighting, underlining, color effects, a visual or audible alert or alarm, a graphical representation, and/or any other indication. The meaning of the status is able to be any meaning including, but not limited to, correct, incorrect, valid, true, false, invalid, opinion, hyperbole, sarcasm, hypocritical, comedy, unknown, questionable, suspicious, need more information, deceptive, and/or any other status. The status is also able to include other information including, but not limited to, statistics, citations and/or quotes. Indicating the status of the information is also able to include providing additional information related to the fact checked information. In some embodiments, indicating includes pointing out, showing, displaying, recommending, playing, presenting, announcing, arguing, convincing, signaling, asserting, persuading, demonstrating, denoting, expressing, hinting, illustrating, implying, tagging, labeling, characterizing, and/or revealing.

In some embodiments, fewer or more steps are implemented. Furthermore, in some embodiments, the order of the steps is modified. In some embodiments, the steps are performed on the same device, and in some embodiments, one or more of the steps, or parts of the steps, are separately performed and/or performed on separate devices.

EXAMPLE 1

A news channel broadcasts a show with political commentary. The show allows a host and guests to discuss various political issues. As the host and guests make comments, their comments are monitored, converted from speech to text and automatically fact checked using online data sources. Based on the results of the fact check, a status of the comments is shown. For example, if the guests respond with factually accurate statements, no alert is displayed. However, when a guest or host makes an untrue statement, an alert is displayed at the bottom of the screen including a quote of the incorrect statement and a correction to the statement. If a guest "spins" a comment, the fact checker is able to determine "spin" and indicate "spin" for the comment and provide data that explains why it is spin. This ensures the guests provide valid data and arguments, as well as maintains the integrity of the show.

EXAMPLE 2

A user is typing a report using a word processor. As the user is typing, the word processor monitors the information being input. Depending on the format of the information, the information may not need to be converted. The information, such as segments of the report, is fact checked. For example, a user is typing a report on the history of New Jersey and types, "Newark is the capital of New Jersey." The fact checker would compare this segment with an online source such as Wikipedia.org and determine that Trenton is the capital of New Jersey. As a result, the word processor would strikethrough "Newark" and next to it, insert Trenton, underlined. Any other means of indicating that the information is wrong is able to be used. In some embodiments, supplemental information and/or citation information is provided. For example, regarding the capital city, information such as Trenton became the capital in 1790, and the state flower is the Common Violet. In some embodiments, the fact checker is used as a citation finder. For example, if a user types in a statement, regardless of whether it is correct, the user is able to select the text and click "cite finder" where the fact checker provides sources that verify the statement. The "cite finder" is not limited to word processing applications and is able to be applied in any implementation.

EXAMPLE 3

A user posting information to his Facebook® page types commentary regarding his favorite golfer, and says, "I can't believe Tiger came in eighth this week." Using additional data such as knowing when the commentary was written and that the user is an avid golf fan, after monitoring this information, converting the information including adding the context of Tiger Woods (the famous golfer), at the Masters, in 2011, the fact checker is then able to compare this information with the results of that specific tournament for that specific golfer. Then, a blurb with a citation is able to be posted on the user's Facebook® page to indicate that Tiger actually finished fourth, or the user is informed so that he is able to correct the page himself.

EXAMPLE 4

A user searches using a search engine by inputting "Alaska is the largest state." The search engine provides a response of True and also displays one or more links to the sources that support the result. In another example using the search engine, a user searches using the phrase, "Magic Johnson is taller than Michael Jordan." The search engine determines that Magic Johnson is 6' 9" and Michael Jordan is 6' 6" and then compares the heights with a mathematical operator to provide the result of True. In some embodiments, the heights of each are displayed, and in some embodiments, one or more cites providing the information used in the comparison are displayed.

FIG. 2 illustrates a block diagram of various implementations of fact checking according to some embodiments. As described herein, some specific implementations are shown including, but not limited to, a word processing component 200 for incorporation with a word processing application, an advertising component 202 for advertising, an entity validity rating component 204 for rating entities, a source rating component 206 for rating sources, a flagging component 208 for flagging items, a voice/facial/biometric recognition component 210 for recognizing entities, a self-checking component 212 for checking a user, a learning component 214 for learning, an auto-correction component 216 for implementing auto-correction, a search engine component 218 for implementing a search engine fact checker, an audio/video/text component 220 for fact checking audio, video, text and any other information, a translator component 222 for translation-fact checking, a text component 224 for fact checking an email, instant message, text messages, tweets or other text communications, an item determination component 226 for determining an item, a media analysis component 228 for analyzing media including but not limited to, television and radio, a re-broadcast component 230 for applying fact checking analysis to re-broadcasted information, a supplemental information component 232 for providing supplemental information to content, an action component 234 for taking an action against an entity based on the fact checking, an opposing arguments component 236 for providing opposing arguments to content, a parallel component 238 for implementing parallel monitoring, processing, fact checking and/or indicating, an importance rating component 240 for determining the importance of content, and a medical fact checker component 242 for fact checking medical information. The various implementations shown are not meant to be limiting in any way and are merely examples of some of the possible implementations.

FIG. 3 illustrates exemplary screenshots of various implementations of fact checking according to some embodiments.

Screenshot 300 shows a word processing display where a user typed a statement, the statement has been fact checked, and a notification appears with a suggestion to correct the incorrect statement. Although a bubble with the correction is shown, any form of indicating an error and/or correction is possible including, but not limited to, underlining, strikethrough, highlighting, an icon, and/or an audible alert. When there are multiple ways of correcting a statement, a user is able to be given options as described herein.

Screenshot 302 shows a television screen where a commentator is making statements. Since the commentator made a false statement, text is displayed at the bottom of the screen indicating the statement is false and providing a correction of the false statement.

Screenshot 304 shows multiple forms of rating speakers on a television broadcast. Statistics for the guest speaker in the window are shown below the window indicating the number of true statements he has made and the number of false statements he has made. A rating is displayed under the host of +10 which, for example, is a positive rating of +10 on a −10 to +10 truthfulness scale. These ratings enable users to determine how trustworthy the speaker is based on past results.

Screenshot 306 shows a smart phone which monitored a user's comments and informed him that he misspoke by saying the U.S. has 51 states.

Screenshot 308 shows a search engine search and result. In the example, the user searches for the fact, "Texas is the largest state." The result presented is "False," a correction is shown, and citations (links) of supporting websites or other sources are shown. In another the example, the user searches for the fact, "Alaska is the largest state." The result presented is "True" and citations (links) of supporting websites or other sources are shown. The displayed results are able to vary from simple (e.g. merely presenting True or False) to more detailed (e.g. presenting True or False, providing a correction if false, providing specific information, and providing citations).

The various implementations illustrated in FIG. 3 are not meant to be limiting in any way and are merely examples of some of the possible implementations.

Figure 4:
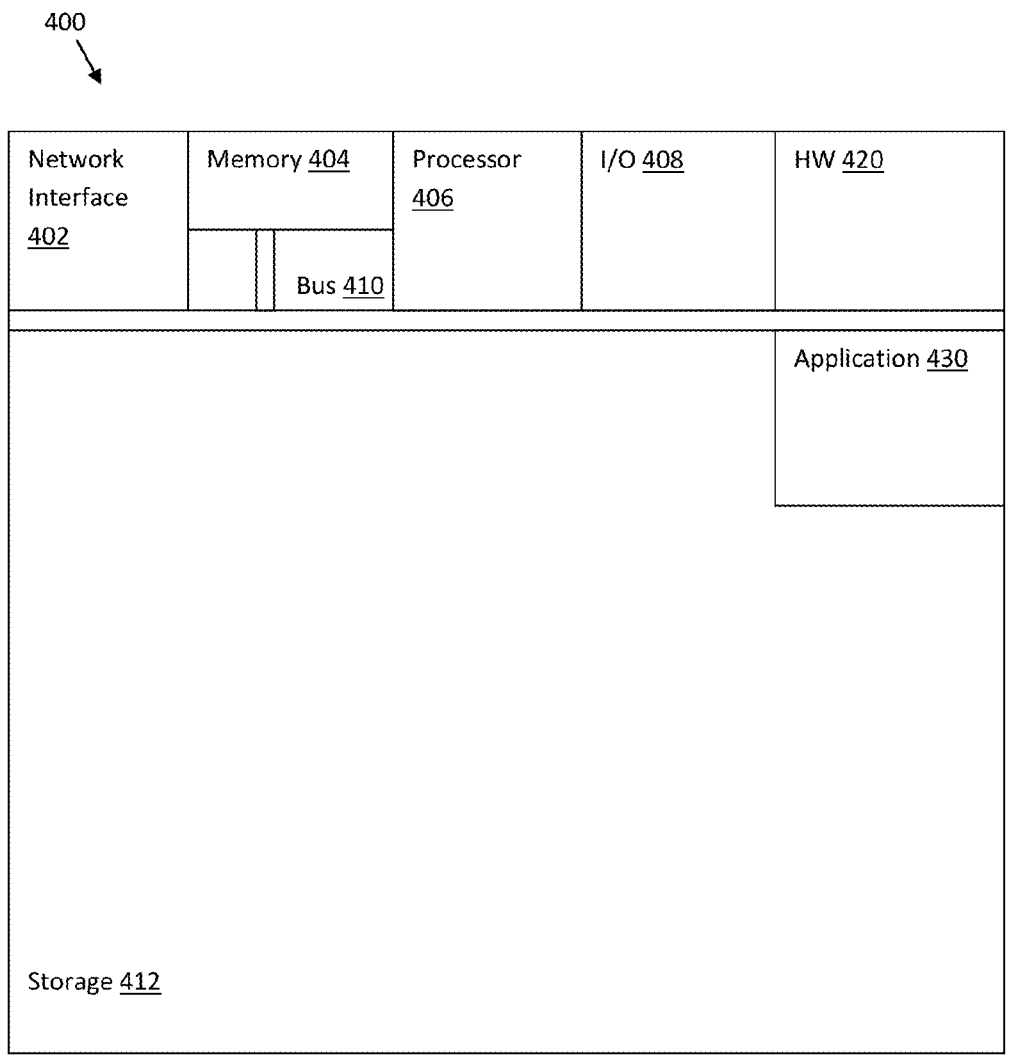
FIG. 4 illustrates a block diagram of an exemplary computing device configured to implement fact checking according to some embodiments.

FIG. 4 illustrates a block diagram of an exemplary computing device 400 configured to implement the fact checking method according to some embodiments. The computing device 400 is able to be used to acquire, store, compute, process, communicate and/or display information including, but not limited to, text, images, videos and audio. In some examples, the computing device 400 is able to be used to monitor information, process the information, fact check the information and/or indicate a status of the information. In general, a hardware structure suitable for implementing the computing device 400 includes a network interface 402, a memory 404, a processor 406, I/O device(s) 408, a bus 410 and a storage device 412. The choice of processor is not critical as long as a suitable processor with sufficient speed is chosen. The memory 404 is able to be any conventional computer memory known in the art. The storage device 412 is able to include a hard drive, CDROM, CDRW, DVD, DVDRW, flash memory card, solid state drive or any other storage device. The computing device 400 is able to include one or more network interfaces 402. An example of a network interface includes a network card connected to an Ethernet or other type of LAN. The I/O device(s) 408 are able to include one or more of the following: keyboard, mouse, monitor, display, printer, modem, touchscreen, touchpad, speaker/microphone, voice input device, button interface, hand-waving, body-motion capture, touchless 3D input, joystick, remote control, brain-computer interface/direct neural interface/brain-machine interface, and other devices. In some embodiments, the hardware structure includes multiple processors and other hardware to perform parallel processing. Fact checking application(s) 430 used to perform the monitoring, converting, fact checking and indicating are likely to be stored in the storage device 412 and memory 404 and processed as applications are typically processed. More or less components shown in FIG. 4 are able to be included in the computing device 400. In some embodiments, fact checking hardware 420 is included. Although the computing device 400 in FIG. 4 includes applications 430 and hardware 420 for implementing the fact checking, the fact checking method is able to be implemented on a computing device in hardware, firmware, software or any combination thereof. For example, in some embodiments, the fact checking applications 430 are programmed in a memory and executed using a processor. In another example, in some embodiments, the fact checking hardware 420 is programmed hardware logic including gates specifically designed to implement the method.

In some embodiments, the fact checking application(s) 430 include several applications and/or modules. Modules include a monitoring module for monitoring information, a processing module for processing (e.g. converting) information, a fact checking module for fact checking information and an indication module for indicating a status of the information. In some embodiments, modules include one or more sub-modules as well. In some embodiments, fewer or additional modules are able to be included. In some embodiments, the applications and/or the modules are located on different devices. For example, a device performs monitoring, converting and fact checking but the indicating is performed on a different device, or in another example, the monitoring and converting occurs on a first device, the fact checking occurs on a second device and the indicating occurs on a third device. Any configuration of where the applications/modules are located is able to be implemented such that the fact checking system is executed.

Examples of suitable computing devices include, but are not limited to a personal computer, a laptop computer, a computer workstation, a server, a mainframe computer, a handheld computer, a personal digital assistant, a pager, a telephone, a fax machine, a cellular/mobile telephone, a smart appliance, a gaming console, a digital camera, a digital camcorder, a camera phone, a smart phone/device (e.g. a Droid® or an iPhone®), an iPod®, a tablet (e.g. an iPad®), a video player, an e-reader (e.g. Kindle™), a DVD writer/player, a Blu-ray® writer/player, a television, a copy machine, a scanner, a car stereo, a stereo, a satellite, a DVR (e.g. TiVo®), a home entertainment system or any other suitable computing device.

Figure 5:
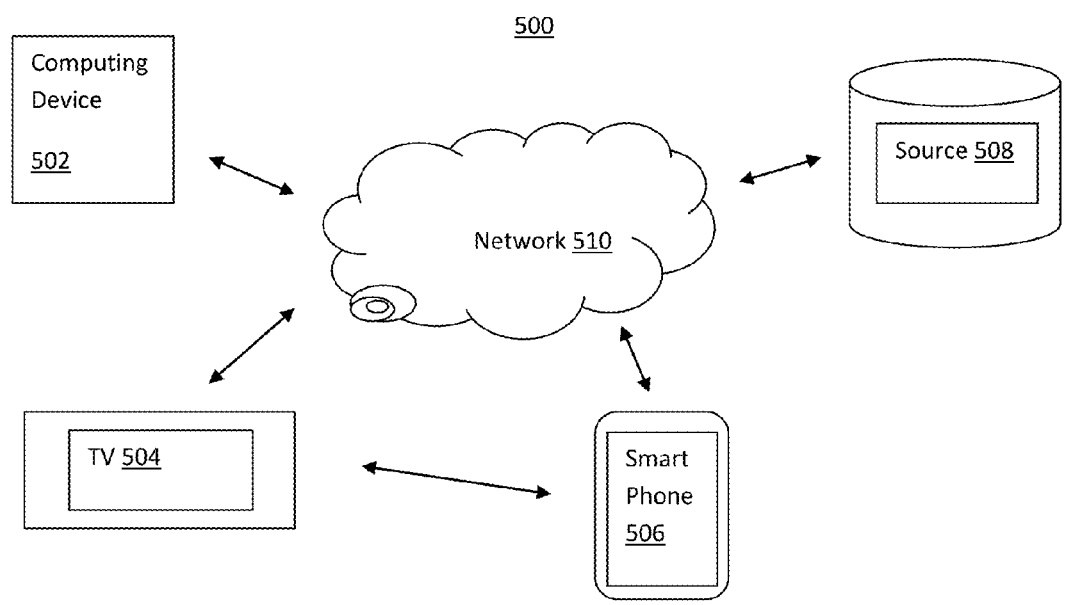
FIG. 5 illustrates a diagram of a network of devices configured to implement fact checking according to some embodiments.

FIG. 5 illustrates a network of devices configured to implement fact checking according to some embodiments. The network of devices 500 is able to include any number of devices and any various devices including, but not limited to, a computing device (e.g. a tablet) 502, a television 504, a smart device 506 (e.g. a smart phone) and a source 508 (e.g. a database) coupled through a network 510 (e.g. the Internet). The source device 508 is able to be any device containing a source including, but not limited to, a searchable database, web pages, transcripts, statistics, historical information, or any other information or device that provides information. The network 510 is able to any network or networks including, but not limited to, the Internet, an intranet, a LAN/WAN/MAN, wireless, wired, Ethernet, satellite, a combination of networks, or any other implementation of communicating. The devices are able to communicate with each other through the network 510 or directly to each other. One or more of the devices is able to be an end user, a media organization, a company and/or another entity. In some embodiments, peer-to-peer sourcing is implemented. For example, the source of the data to be compared with is not on a localized source but is found on peer sources.

For example, a news company uses its computers to monitor and process information presented on its broadcast. The processed information is then fact checked with one or more sources (on site and/or external), and then the results are presented to the user's home device such as a television. The monitoring, processing, fact checking and presenting are all able to occur locally at the news company, externally by another entity, or parts occur locally and parts occur externally. In a modified example, the results are sent to and presented to a user on her computer, smart phone or tablet while she is watching television.

In another example, when a user is watching television, the user's smart phone monitors and processes information from the television and sends the information to be fact checked, and then the results are presented on the user's smart phone.

In another example, when a user is watching television, the user's computing device monitors and processes information from the television and sends the information to be fact checked, and then the results are presented on the user's computing device.

In another example, when a user is watching television, the user's smart phone monitors and processes information from the television and sends the information to be fact checked, and then the results are sent from the user's smart phone to the television to be presented.

Any combination of devices performing the fact checking system is possible.

Implementations

Advertising

In some embodiments, advertising is incorporated with the fact checking system. For example, a fact checking result includes, "This fact check is brought to you by: Company X." In some embodiments, the advertising is related to the item being checked or the result of the fact check. For example, if the fact to be checked is "California is the most populated state," an advertisement about California is presented. In some embodiments, the advertising is based on other information instead of or in addition to the fact to be checked including, but not limited to, a user's age, sex, location, occupation, industry of the fact, location of a subject, or any other information. In some embodiments, personal networking information is used including, but not limited to, Facebook® information. In some embodiments, coupons are presented with the fact checking. For example, if a fact to be checked is whether "Ice Cream Z is gluten-free," a coupon for Brand Z ice cream is presented to the user. Another example is pay per click or click-through money-making Any other implementation of making money using the fact checking system is able to be implemented. FIG. 6 illustrates exemplary implementations including an advertisement 600. Additional advertising implementations are described herein, for example, in the Supplemental Information section.

Entity Validity Rating and Recognition

In some embodiments, an entity including, but not limited to, a speaker, author or another entity (e.g. corporation) has a validity rating that is included with the distribution of information from him/it (for example, see FIG. 3, screenshot 304). For example, if a politician has been found to have misstated the truth, an indication of such is able to be displayed when he appears on a television program. In another example, when a commentator appears, statistics of how many factually accurate statements have been made by him and/or factually inaccurate statements have been made by him are presented during the show. In some embodiments, parameters related to the statistics are able to be selected (e.g. specific to a show or a time period). In some embodiments, a running tally is presented throughout the show. The indication is able to include any information including, but not limited to, statistics, highlighting, the other indications described herein and/or any indication to further inform the audience of his trustworthiness. In the example further, text appears on the television screen, such as at the bottom, which states, Senator A has misstated the truth 10 times, but has been truthful 20 times. The severity of the misstatement is also able to be factored in when rating a person or entity. For example, stating that something occurs 90% of the time but in reality it occurs 89% of the time is a minor and possible ignorable mistake. However, stating something occurs 90% of the time when it occurs 20% of the time is not likely a rounding error or a slip of the tongue. Additionally, the subject of the mistake is also able to be taken into account in terms of severity. For example, if a person makes an untrue statement about the country of origin of baseball, that is a minor mistake, whereas making an untrue statement about tax information is a major mistake, and the major mistake is weighted more than the minor mistake. In some embodiments, an independent agency determines what is major and what is minor. In some embodiments, individual users are able to indicate what is important to them and what is not. In some embodiments, another implementation of determining what is major, minor and in between is implemented. The context of the situation/statement is also able to be taken into account. In some embodiments, entities are able to fix their validity rating if they apologize for or correct a mistake, although measures are able to be taken to prevent abuses of apologies. Another specific form of indication includes gradients of coloring such that a truthful person is highlighted with a border in bright green, and the green becomes less bright as the truthfulness of the person decreases and becomes red when they are viewed as less than truthful, ultimately reaching bright red when considered completely untruthful. Any combination of colors is able to be used, or any other indication described herein is able to be used. In some embodiments, in addition to or instead of a validity rating, an entity is able to include another rating, including, but not limited to, a comedic rating or a political rating. In some embodiments, an entity includes a classification including, but not limited to, political, comedy or opinion. Examples of information or statistics presented when an entity appears include, but are not limited to the number of lies, misstatements, truthful statements, hypocritical statements or actions, questionable statements, spin, or any other characterizations. In some embodiments, the information or statistics are available through a link, mouse-over, picture-in-picture or other implementation. In some embodiments, specifics of the statements are able to be viewed; for example, by clicking on "hypocritical statements," a list of the hypocritical statements is presented to the user. In some embodiments, both the hypocritical statement and the source statement are shown. In some embodiments, the source for one or both of the statements is shown. Additional statistical information is available too, including, but not limited to, the severity of the statement (e.g. egregious lie versus minor mistake). In some embodiments, users are able to specify an amount of statements shown: by number of statements, by time period of statements (e.g. last 6 months) or by any other implementation. For example, Person X's last 5 hypocritical statements (out of 30) are shown. In some embodiments, dates or time frames are used in determining the relevance of fact check comparison. For example, if a hypocritical statement was made 30 years ago, the fact checker may realize that it was more likely a change of view rather than a hypocritical statement; whereas, a contradictory statement made 2 weeks ago is likely due to hypocrisy not a change of view. In some embodiments, friends, family members, co-workers, users and others have validity ratings.

In some embodiments, the entity rating is implemented using a database or other data structure. For example, the database includes a column or row with names and their corresponding entity rating. In embodiments where additional information is stored, additional column(s) include specific information such as hypocritical statements, severity of the mistakes, and any other information. The database is then used to look up the entity's information for indicating the information.

In some embodiments, people/face recognition is implemented. For example, a politician is on a talk show, and the face recognition identifies the politician. Once recognized, information about the politician is displayed including, but not limited to, the validity rating described herein, statistics, and/or other information. In some embodiments, the information posted includes quotes of most outrageous things said, most truthful things said, or other specific quotes. Similarly, other recognition is able to be implemented including, but not limited to, voice recognition or biometric recognition. For example, a mobile application recognizes who is talking by voice recognition and posts a validity rating and/or other information on the phone. In other examples, at a dinner party the mobile application is able to identify a person who tells tall tales, or at a negotiation, the application is able to indicate if the opposing side is honest. Voice recognition is also able to identify someone on a television show or radio show. In some embodiments, users' online/screen/usernames are identified. In some embodiments, a person's identity is input by a user, and then information is displayed about that person. FIG. 6 illustrates exemplary implementations including facial/people recognition 602.

In some embodiments, when an entity is displayed (e.g. on a device screen), the entity's positions on topics are displayed. For example, political positions are displayed (e.g. pro-life, pro-choice, anti-tax, others). The positions are able to be regarding a lighter material than political positions such as personal preferences regarding foods, entertainment and any other information. In some embodiments, different magnitudes regarding the positions are able to be displayed. For example, if someone is a fervent anti-war activist, the person's fervor is indicated. In some embodiments, evidence is provided showing the entity's position. For example, a voting record is shown to indicate that the person may be saying she is against raising taxes, but voted 10 times to raise taxes while in Congress. FIG. 6 illustrates exemplary implementations including entity information 604.

Flagging

In some embodiments, users are able to flag statements. FIG. 6 illustrates exemplary implementations including flagging information 606, where highlighting text is shown. Users are able to flag the statements using Twitter, polling, text messaging (e.g. SMS or MMS), audio texts, video texts, phone, voice, selecting (e.g. with a mouse, keyboard, remote control, hand-waving, body-motion capture, touchless 3D input or joystick), highlighting, copying, or any other implementation of flagging a statement. In some embodiments, a flagged statement is then highlighted or another effect is applied. Flagging is also able to include a "thumbs up"/ "thumbs down" or "happy face"/"frown" representation, for example, users who feel the statement is valid would give a "thumbs up." Although the word "flag" is used, the strict definition is not implied. Any form of highlighting, pointing out, commenting on, selecting, or linking to is able to be implemented. Comments are able to be flagged as valid/true, invalid/untrue, questionable, unverifiable, depending (on context) or using a scale including, but not limited to, 1-10, where 1 is blatantly false and 10 is definitely true. Comments are also able to be flagged as spin, comedy, sarcasm, hyperbole, hypocritical and/or any other characterization. Comments are able to be flagged to force them to be fact checked (e.g. manually forced fact checking). Additionally, comments are able to include support for the flag, including, but not limited to, a citation supporting or proving the user's position. In some embodiments, the users who flag statements are rated. For example, the users are rated by comparing their flagging with results of a fact check. In some embodiments, if a user is wrong often, then his flag is not used. In some embodiments, if a user's rating is or falls below a threshold, the user is ignored. In some embodiments, separate classes of users are implemented for flagging, including, but not limited to, media, viewer, and professional. In some embodiments, if a user is correct often, his flag is used and is able to have a stronger value. In some embodiments, a weighting scheme is used such that a value of a user's flag is proportional to the correctness of previous flags. For example, if User A flags 100 items as wrong, and after a fact check, the user is found to have wrongly flagged 95 items, that user's future flags will have little weight or will possibly be ignored; whereas, if User B flags 100 items as wrong, and after a fact check, the user is found to have correctly flagged 95 items, that user's future flags will have weight and possibly additional weight compared to others. In some embodiments, a competition is implemented using flagging where users are asked to assess the validity of statements, and the user who is correct the most often wins the competition. Any other competitions involved with fact checking are possible as well.

Structure, Execution and Sources

In some embodiments, a site is specifically designed (e.g. formatted) for data verification or fact analysis. For example, common quotes and/or data are appropriately formatted to be compared with other text, speech or any other communication. In an example, speech checking occurs such that if a commentator says, "Person A said X, Y and Z," a digital version of the transcript would be located and compared to determine if Person A actually said X, Y and Z.

In some embodiments, the fact checking system has the ability to learn. The learning is able to be in terms of context, detecting items like sarcasm, cheating or manipulation of data sources and other items that would help the fact checking process. In some embodiments, a database is used to track people's comment habits or history and other information. For example, if Person X is known for using hyperbole, the fact checking system is able to recognize that and then provide future indications using such knowledge. In some embodiments, new sources are able to be found using learning. For example, a crawler, data miner, bot, and/or other implementation is able to search for and utilize additional sources of information for fact checking. Learning is also able to include analyzing archived data of sources to determine the reliability of the sources. In some embodiments, if a characterization or other item has not been learned, an expandable list of options is presented to a user for the user to select an option.

In some embodiments, an auto-correction feature is implemented. For example, if text is being monitored, when a factual statement is inaccurate, the text is automatically changed. In some embodiments, the user is asked if they want to correct the statement. In some embodiments, the flawed text is merely indicated including, but not limited to, underlined, highlighted or change in font/color. In some embodiments, in video, the auto-correction feature automatically posts text on the video with the correction.

In some embodiments, specific phrases known to be true or false are added to a database and/or a website, so that the fact checking system is able to indicate the correctness of the phrase. For example, if one news organization is known for misquoting someone and continuing to use the misquote instead of the correct quote, that is able to be determined, and the quote is indicated as incorrect. In some embodiments, the correct quote is displayed or is accessible (e.g. through a hyperlink).

In some embodiments, determining which phrases to be fact checked is performed automatically (e.g. by a computing device). In some embodiments, determining which phrases to be fact checked is performed manually. For example, while a television broadcast is occurring, one or more individuals select segments of the broadcast to be fact checked. As a further example, if a person says, "we need to do something about taxes, unemployment is at 10%," the first part of that sentence probably does not need to be fact checked or is labeled an opinion, but "unemployment is at 10%" is an easily verifiable fact. In some embodiments, manual and automatic fact checking are implemented together. For example, a user selects a sentence to be fact checked out of a paragraph, but a device automatically parses the sentence for separate phrases to be fact checked.

In some embodiments, information is checked for being stale or outdated. For example, if a news organization runs a story that occurred many months ago but presents the story as occurring recently, the fact checking system is able to alert the user by presenting a date of when the story initially occurred. Determining if the information is stale is able to be performed in any manner including, but not limited to, a date comparison. In some embodiments, fact checking is updated as information changes. For example, saying X is running for President may be labeled as "uncertain" at one point, but then when X officially declares that he is running, the label is changed to "true."

In some embodiments, the source of the information to be checked and/or the organization presenting the information to be checked are related to and/or are working in cooperation with the fact checking system. For example, a news organization implements its own fact checking system to present results to viewers. In some embodiments, the source of the information to be checked and/or the organization presenting the information to be checked are unrelated to and/or are not working in cooperation with the fact checking system. For example, a company independent from the news organization implements the fact checking system on a user's mobile device so that when the mobile device receives information from the news organization, the mobile device performs the fact checking.

In some embodiments, caching is implemented to speed up the fact checking process. Caching is able to be implemented in any manner. In an example, if Commentator X is known to spread the same lie, that specific lie is not re-checked; rather, when that lie is made, an indication that the statement is a lie is presented based on cached analysis of the statement. In some embodiments, cached data is re-checked periodically to ensure the data does not become stale. In some embodiments, the re-checking occurs in the background to avoid interruption of any other processing.

Any search algorithm, sorting algorithm, data structure and/or other data organizational or analysis scheme is able to be used to implement the fact checking system and any other systems described herein. For example, advanced search algorithms, advanced search text algorithms, indexing and searching by indices, including combinations of search implementations, are able to be used. Data structures including, but not limited to, arrays, queues, maps, buffers, tables, matrices, lists, trees, heaps, graphs, classes and subclasses, databases, and other structures, including combinations of data structures are able to be used. The search, sorting, data structure and/or other data organizational or analysis scheme is able to be used in any aspect of the fact checking system including, but not limited to, locating sources, organizing sources, comparing information with source information, searching within sources, storing sources and any other aspect. In another example, a data structure is used for implementing the fact checker and/or providing supplemental information by storing relationships and/or related items, including, but not limited to, arguments/opposing arguments, misquotes/correct quotes, brands/competitors, and/or any other items.

In some embodiments, pattern recognition of recognizing a pattern is implemented in any aspect of the fact checking system. For example, the pattern recognition is implemented in monitoring information. In another example, the pattern recognition is implemented in processing the information. In another example, pattern recognition is implemented in fact checking including, but not limited to, locating sources, organizing sources, comparing information with source information, searching within sources, storing sources and any other aspect.

In some embodiments, a queue or other structure is implemented to store facts or other items to be checked when a connection is not available.

In some embodiments, sources are rated based on popularity or "trending." For example, if Site X has 1,000,000 individual hits per day, and Site Z has 50 individual hits per day, Site X has a higher popularity. Popularity is able to be established using any method including, but not limited to, total hits per time frame, unique hits per time frame, quantity of links to the source, quality of linking items to the source, duration of existence of the source, any other method and/or any combination thereof. Any of the sorting, filtering and applying of thresholds described regarding reliability ratings and sources is able to be applied to popularity and sources. For example, the fact checker is able to be limited to sources with a popularity above a specified threshold. In some embodiments, both popularity and reliability are implemented in determining which sources to use. In some embodiments, other reliability determinations are used with the popularity rating to determine the reliability of a source.

In some embodiments, the sources are ordered by reliability (for example, as shown in FIG. 7), and when information is fact checked, the process of fact checking starts the search with the most reliable source and continues to less reliable sources. In some embodiments, a structure such as a tree, list or any other structure includes pointers to the sources ordered by reliability. In some embodiments, the order is descending order from most reliable to least reliable. In some embodiments, the order is ascending order from least reliable to most reliable. In some embodiments, the order is configurable. In some embodiments, a fact checking search stops after N (e.g. N=2) sources verify the fact.

A short version of an exemplary list of sources ordered by reliability includes:

1. a link to the Random House Dictionary website with a reliability rating of 100% reliability,
2. a link to the Britannica Online Encyclopedia website with a reliability rating of 100% reliability,
3. a link to the XYZ News website, with a 90% reliability, and
4. a link to Bob's made-up-opinion-on-all-things website, with a 1% reliability.

In some embodiments, multilevel fact checking is implemented. For example, a phrase is fact checked, but before the fact check is completed, the source is fact checked to determine if the source is reliable. The multilevel fact checking is able to continue until a reliable source is found, and then the fact check of the phrase is completed with the reliable source.

In some embodiments, sources are classified as fact/objective and opinion/subjective. For example, a data structure such as a tree is implemented with objective sources on one side of the tree and subjective sources on the other side of the tree. In another example, as one goes left to right at the bottom of the tree, the sources go from most objective to most subjective. The sources are able to be classified by determining what the majority of their content is, by being classified by a user, by including a classification tag, or any other method.

In some embodiments, a determination of whether information is taken out of context is made. The determination is made by comparing the audio, video, text and/or other content used with the original or full version. For example, if a news organization shows a clip (e.g. portion of a video), the entire video is made available to a user for a period of time before and/or after of the clip is shown. For example, 30 seconds of the video before the clip started is shown.

In some embodiments, the data verification or fact checking occurs on a remote server including, but not limited to, a central server. The results are able to be cached and/or sent to users' local machines. In some embodiments, the data verification or fact checking occurs at a user's local machine. In some embodiments, the data verification or fact checking occurs using cloud computing.

The fact checking system is able to be implemented on a separate device that couples or communicates with a television; as part of a television, radio or Internet broadcast or any other broadcast; on a mobile device including, but not limited to, an iPhone® or Droid®; on a computer; on a tablet including, but not limited to, an iPad®; or any other device.

In some embodiments, the fact checking system is a smartphone application including, but not limited to, an iPhone®, Droid® or Blackberry® application. In some embodiments, a broadcaster performs the fact checking. In some embodiments, a user's television performs the fact checking. In some embodiments, a user's mobile device performs the fact checking and causes (e.g. sends) the results to be displayed on the user's television and/or another device. In some embodiments, the television sends the fact checking result to a smart phone.

In some embodiments, parallel monitoring, processing, fact checking and/or indicating is implemented. For example, two or more implementations of a fact checker are used. In the example, the two or more implementations are able to be on the same device or on different devices. In a further example, each implementation is different, and then the results of each are compared to determine a "best" result and/or to provide several results. For example, one implementation of a fact checker excludes certain sources, while another fact checker uses all sources, and their results are able to be different, and in some embodiments, the different results are presented to a user and/or ratings are provided with the results and/or other information is provided. In some embodiments, monitoring and processing are implemented in parallel with fact checking. For example, one device monitors and processes information and a second device performs the fact checking while the monitoring and processing occurs. In some embodiments, pipelining is implemented. In some embodiments, distributed processing is implemented. For example, multiple devices perform fact checking (e.g. searching, comparing and returning results) and return a composite result. In some embodiments, separate fact checkers are implemented to fact check multiple data providers (e.g. broadcasters, newspapers, websites and/or any other communications/information). In some embodiments, the fact checking multiple data providers occurs at the same time, and in some embodiments, the fact checking occurs at different times. For example, 3 fact checkers are implemented to fact check 3 major cable news networks. In some embodiments, one fact checker is able to fact check multiple data providers at the same time. When fact checking multiple data providers, the information from each is able to be shared, compared, and/or any other processing/analysis is able to be performed. For example, if 5 out of 6 data providers lead with Story A, but the 6th data provider leads with Story B, an indication is able to be made that Story B is presenting different information. In some embodiments, multiple fact checkers are used to fact check different aspects of a show. For example, a first fact checker is used to fact check historical information, a second fact checker is used to fact check charts and graphics, and a third fact checker is used to provide supplemental information.

Supplemental Information

FIG. 8 illustrates an example of providing supplemental information based on information from a television 800 where the supplemental information is displayed on a user's mobile device 802. In some embodiments, the fact checking system provides clarifying comments or additional (or supplemental) information to assist a user or viewer. For example, if a commentator makes a general statement that the cost of a cleanup will cost X dollars, the fact checking system is able to find specifics regarding the cost and provide a detailed explanation of each component of the total cost.

FIG. 9 illustrates a flowchart of a method of providing additional or supplemental information according to some embodiments. In the step 900, information is monitored. For example, broadcast information (e.g. a television program or advertisement) is monitored. In the step 902, the information is processed. For example, the information is parsed. In the step 904, additional or supplemental information is searched for and returned. For example, a database is searched to find opposing arguments to an argument, or supporting arguments are searched for on web pages, or a competitor's advertisement is located in a database, or any other supplemental information is found and returned. The amount of information returned depends on the implementation. For example, a link to a webpage could be returned, a link to a video, the video itself, text, and/or any other information is returned. In the step 906, the supplemental information is indicated or displayed. For example, an opposing argument is displayed on a mobile device. As described herein, monitoring, processing, searching and indicating are able to be implemented in many different ways and are able to include many different items.

In some embodiments, supplemental information is provided without performing the step of fact checking. For example, monitoring, processing and indicating still occur, but instead of fact checking, supplemental information is found and returned. As an example, a news show is monitored, processed (e.g. converted and parsed), and then supplemental information is determined (e.g. located) and indicated. For example, a person discusses a new candidate from North Dakota, North Dakota is searched for and is found in an encyclopedic source, some or all of the encyclopedic information is retrieved, and supplemental information providing statistics about North Dakota is shown. In another example, a person states, "the U.S. debt has been growing significantly under this President;" supplemental information is able to be displayed showing U.S. debt growth under some or all of the previous Presidents. In another example, if a complex issue is discussed, clarification is provided. For instance, if a complex economic issue is discussed, the issue is broken down into simpler parts. In yet another example, if something is explained incorrectly or not clearly, clarification is provided. For example, during the Presidential race, national polls are displayed regularly; however, national polls mean very little due to the Electoral College election system of the U.S. Therefore, supplemental information providing battleground state polling is able to be shown to supplement the national polls. In some embodiments, supplemental information is provided for both sides of an argument. Any of the other steps and implementations described herein are applicable to provide supplemental information without fact checking.

In some embodiments, supplemental information includes an advertisement. In some embodiments, a price comparison is displayed. In another example, a viewer is watching an awards show and on the red carpet, celebrities are wearing designer brands of attire, and an advertisement for each dress/suit/shoe/clothing/jewelry/items is displayed (or a similar knock-off item is displayed). In some embodiments, the supplemental information is presented on the same device the user is watching (e.g. television). In some embodiments, the supplemental information is presented on a separate device such as mobile device and/or another device. In some embodiments, the supplemental information is a Tweet, an email, a text message and/or any other communication. In some embodiments, the advertisement is presented during the program being viewed, and in some embodiments, the advertisement is presented after the program is viewed.

In some embodiments, supplemental information is provided based on a headline, title, caption, talking point and/or other short phrase. For example, titles (or any other short phrases) are monitored, processed, fact checked and a result is indicated. In some embodiments, the step of fact checking is replaced with finding supplemental information. By focusing on just the title, less processing takes place. For example, if a news program begins the show with "Nasdaq Hammered," statistical information of the worst days for the Nasdaq are indicated for the user. In another example, if a headline states, "Taxes Going Up," supplemental information that specifies which taxes are going up, by how much and when the taxes are going up is indicated. Or in some instances, rebuttal supplemental information that indicates taxes are not going up (e.g. if the information is outdated or new information showing taxes are not going up) is presented. The amount of supplemental information is able to be as short as a single word (e.g. False!) or as detailed as a 200+ page study or anywhere in between and including any kind of information to provide the user with more information. In some embodiments, analysis of only the title (or other heading) is used for an opposing view to be presented. For example, if a headline states, "Global Warming Causing Wildfires," supplemental information of an opposing view that discusses how the wildfires are caused by La Nina is presented.

Supplemental information is found and returned in any manner, including, but not limited to, the same or similar manner(s) described regarding fact checking. For example, information is searched for by comparing the information with sources, and information related to the searched for information is returned. In another example, the supplemental information is stored in a data structure such as a database or table.

In some embodiments, one or more opposing arguments are indicated in response to content or information. In some embodiments, the opposing arguments are based on fact checking information. In some embodiments, the opposing arguments are indicated without fact checking the information; rather, opposing arguments are determined and presented. For example, an argument is determined, the argument is classified, an opposing argument is determined, and then the argument is presented. In some embodiments, a table (or other data structure) contains arguments and matching opposing arguments. In some embodiments, the opposing argument or supplemental information is based on political classification. In some embodiments, a set of links of arguments are coupled with opposing arguments. For example, a pro-life argument is detected, which finds that argument in the table, and then the counter-argument coupled with the argument is found. FIG. 10 illustrates an exemplary table of arguments and counter-arguments according to some embodiments. Sub-arguments and sub-counter-arguments are also able to be included. In another example, if a person makes a comment with a position, an opposing position is indicated without fact checking the position. To further the example, if a guest on a political show makes a comment, an opposing position is indicated on the television screen in text. Indicating the opposing position is able to be in any manner as described herein (e.g. text on a television screen or text on a mobile device). In some embodiments, determining the opposing argument is able to be based on keywords detected, based on the speaker/author/entity of the position, based on political leanings of the speaker/author/entity, based on context, based on metadata, and/or based on any other detection described herein. For example, if a keyword of "abortion" is detected, and the speaker is a strict conservative, a description of a liberal view is presented. In another example, if keywords of "President" and "economy" are detected by a liberal commentator, context is able to be used such as the current date to determine which President is being discussed, and economic data, past and present, including comparisons, is able to be presented to the user. Such additional information would help guarantee a balanced presentation of information to users.

In some embodiments, an opposing advertisement is presented when an advertisement is presented. For example, if there is a commercial for Beer X displayed on the television, a commercial for Beer Y is displayed on the user's mobile device, on a smaller section of the television (e.g. bottom of the screen), or another device. FIG. 11 illustrates an exemplary table with Brand X and Brand Y, where when a Brand X commercial is detected, a Brand Y commercial is displayed on the user's device, or vice versa. In some embodiments, a fee scheme is implemented with this to collect advertising money from Brand Y. In some embodiments, multiple companies/products are included within the table (e.g. Brand X, Brand Y and Brand Z), and when one is detected one or more of the others is displayed (e.g. in a random manner, in an alternating manner, based on advertising fees by the brands, or in any other manner). In another example, when an advertisement for a new medicine is detected, supplemental information providing the side effects and other negatives is displayed. In another example, an opposing political advertisement is displayed. In some embodiments, the groupings of the arguments or commercials/products/companies are generated automatically (e.g. based on searches), and in some embodiments a user inputs groupings, or both are implemented. In another example, an advertisement for Candidate X is displayed, and an advertisement for Candidate Y is displayed on the same device or another device. In some embodiments, a correction or contradiction to an advertisement is displayed. For example, an advertisement says, Candidate X raised taxes N times, and a correction and/or advertisement explains Candidate X never raised taxes. As described herein, an automatic rebuttal is able to be implemented. For example, if Candidate X knows of the advertisements run by Candidate Y which attack Candidate X, Candidate X is able to generate advertisements that directly refute the attacks which are then run at the same time or in response to the Candidate Y advertisements (for example, using a table similar to FIG. 11 where Candidate X and Candidate Y are in the same row of the table or another form of linking). In some embodiments, the original content (e.g. advertisement) and the opposing content are displayed on the same device, and in some embodiments, the original content and the opposing content are displayed on different devices (e.g. original on television, opposing on mobile device or vice versa). As described herein, in some embodiments, a commercial or advertisement is detected based on a product, a company and/or language in the commercial/advertisement, metadata, or any other method. For example, an advertisement for Soda Brand X by XYZ Corp. is detected based on monitoring for "Soda Brand X," "XYZ Corp." and/or a catch-phrase or other language used in commercial/advertisement. In some embodiments, a commercial/advertisement is detected using another implementation.

In some embodiments, opposing arguments are presented by an opposing entity including, but not limited to, a website, television company/network/station, person, company and/or other entity. Information is able to be monitored, processed, compared with/searched for (e.g. in a lookup table or database) and then the opposing argument is presented. For example, a first entity is able to fact check and/or respond to another entity with the first entity's analysis (possibly biased analysis). The first entity makes selections of how to fact check, analyze and/or respond. The selections include but are not limited to the site/station/network/show to analyze, keywords or arguments to look out for, responses to arguments, sources to use, styles of responses, format of output, and/or any other selections. For example, a conservative blogger selects a liberal news organization to monitor, specifically indicates to automatically monitor for "global warming" and indicates a set of links to books and articles to be displayed that present an opposing view of global warming. Then, when a viewer is watching programs from that organization, any time global warming is discussed, the viewer is presented the set of links. In some embodiments, the arguments and opposing arguments are stored in a data structure such as a table. In some embodiments, the selections are grouped by political classification (e.g. liberal, conservative or any others) and/or grouped by other classifications, for example, so the user only has to select his political classification without specifying other details. In some embodiments, a user makes selections (e.g. specifying that he is a conservative), and in some embodiments, the selection is automatic. The automatic selection is able to be based on analysis of websites the user visits (e.g. browser history shows he goes to liberal websites, so automatically select liberal), based on purchases the user makes (e.g. buys "green" products, so automatically select liberal), based on television/radio shows watched/listened to (watches conservative talk show, so automatically select conservative), and/or any other automatic selection. In some embodiments, a database or other data structure is used to classify and store the website names/links, television shows, and any other information. In some embodiments, a user's selection is automatically generated based on social networking information such as associations (e.g. if Facebook® friends are conservative, assume user is conservative). In some embodiments, users are able to make several selections to further specify their orientations (e.g. selecting: socially liberal, fiscally conservative, and environmental). The selections are able to be very broad, very specific, somewhere in between, and are able to be many selections or a single selection.

In some embodiments, advertising is presented based on a user's selection(s) and/or classification(s). In some embodiments, advertising is presented based on the monitored language. For example, if a user is indicated as liberal and a global warming topic is monitored, a Prius advertisement is presented. Additional information regarding the user is also able to be incorporated in determining the advertisement to be presented. For example, if the user is a new mom and liberal, and an environmental topic is presented, an advertisement for "green" diapers is presented. FIG. 12 illustrates an exemplary data structure (e.g. a database or a table) implementing selections and advertising. In the example, user selections/information, keywords to monitor and advertisements are maintained, as well as any other relevant information. Further in the example, user information includes that the user is a liberal and an environmentalist, therefore the keyword/phrase "Global Warming" is monitored for, and when detected, an advertisement for a Hybrid X Vehicle is displayed. In some embodiments, recent search history of the user is also included in the data structure.

In some embodiments, supplemental information is indicated for entertainment shows. For example, if a television show is about teen pregnancies, then educational videos, images, links, statistics, games, advertisements, or any other information is indicated. The supplemental information is able to be found using any implementation such as by the searching and comparison described herein including searching a data structure (e.g. a database) which stores the information to be presented in response to the entertainment information. In another example, if the show appears to glorify teen pregnancies, information regarding the negatives of teen pregnancy is presented. Similarly, if a television network is promoting purchasing housing or even "flipping" housing, negatives of owning housing or the dangers of "flipping" housing are presented. In some embodiments, specific details about the "flipped" house are shown, for example, the purchase price, the expenses, and the sales price. For sports shows, statistics and/or other information is shown. For example, if a user is watching a football game on television or on his mobile device, and the game is in the fourth quarter, and the quarterback just threw a completion, additional information is presented on the user's television or mobile device which shows statistics (e.g. game statistics, historical statistics, other statistics, personal information, other information) of the quarterback. For example, to increase the viewing audience, the personal information could be information that would interest a person not interested in football itself, including, but not limited to, the player's girlfriend, age, alma mater, home town, likes/dislikes, and other information to entice other viewers to watch. In some embodiments, the supplemental information explains the sport/game including, but not limited to, what just happened, why there was a penalty, the rules of the sport/game (e.g. how to play Texas Hold'em), the purpose of the sport/game and/or any other explanation to help the audience. In some embodiments, the supplemental information provides an easy way to purchase items. For example, a football jersey advertisement is presented for the jersey of the player who just had an exciting play. The way to purchase the item(s) could be a link to a store to purchase the items, a single button purchase or any other way of providing sales. The supplemental sales information could be related to a commercial or advertisement. For example, if a commercial is displayed for X Brand mountain bikes, then a store locator is displayed on a user's device indicating where to purchase the X Brand mountain bike, or an online site with a link to purchase the item (e.g. bike) is presented. In some embodiments, when a movie is being played, related movies are presented or information including, but not limited to, a description, rental information, and purchase information is presented. In some embodiments, if a movie or other item is referenced in another movie, television show, or other content, a clip, transcript or other information of the movie or other referred item such as a book or a poem is presented. For example, when George sings "Master of the House" from Les Miserables in "Seinfeld," a clip of the musical is shown or lyrics are displayed on the user's device.

In some embodiments, the supplemental information is related to sports betting/play-along including, but not limited to, fantasy football and college basketball brackets, where a user's fantasy team or bracket is updated automatically in sync with the game results. For example, if a basketball game ends, the user's bracket is automatically updated and presented on the user's device including the current standings. In another example, as the football games occur, a player's fantasy team information is updated during the games and presented on the user's device.

In some embodiments, news, weather, traffic and/or other information is fact checked by comparing the information with other stations' results (e.g. fact checking by comparison with peers is performed). For example, if News Company A states Candidate X paid $0 in taxes last year, but News Company B, News Company C and News Company D all say, Candidate X paid $100,000 in taxes, the additional information is presented to the user. In another example, if meteorologist at Channel A says it will be 80 degrees today, but meteorologists at Channels B through D and online sites Y and Z say it will be 90 degrees today, the additional information is presented to the user. In some embodiments, if a story (e.g. news story) is incomplete on one station, or another station has supplemental information, that information is presented to the user. For example, if one station does not indicate the victim's race, but another station does provide this information, that supplemental information is presented (e.g. as text at the bottom of the screen with credit given to the providing source). Determination of the missing information is able to be by comparing keywords in the information, processing and formatting the information (e.g. by searching for specific items in a story and determining if any information is missing) or any other implementation. For example, for a news story about a homicide, a data structure contains elements for race of the attacker and victim, age of the attacker and victim, motive, location, weapon, and any other information. And if any of the information is unknown from one channel/site/network, other sources of information are able to be used to fill in the missing information.

In some embodiments, supplemental information is provided by the same source that is providing the original content (e.g. XYZ Network broadcasts a political show and also provides supplemental information). In some embodiments, supplemental information is provided by a third party (or independent party). For example, XYZ Network broadcasts a political show, and TTT App provides supplemental information to be displayed with the political show, where TTT App has no affiliation with XYZ Network.

In some embodiments, supplemental information is provided when the fact checker is used for print articles. For example, after a user acquires content of an article in a magazine, supplemental information related to the article is provided including, but not limited to, where to buy an item in the article, what the latest study says about the content of the article, and any other information.

In some embodiments, a running log of supplemental information is kept. In some embodiments, the running log is user-specific and/or device-specific. For example, the supplemental information for Bob is based on what Bob has been viewing, reading and/or receiving. In some embodiments, by keeping a log of the supplemental information, repeated indication of supplemental information is avoided. For example, if a viewer of a television show has already been provided with supplemental information about a character, that supplemental information is not automatically shown again. In an additional example, a data structure stores information indicating what supplemental information has been displayed to a specific user, and then that information is used to determine what supplemental information to display, if any. In some embodiments, updated supplemental information is shown based on the previous supplemental information. For example, if character information has previously been shown to a user, but there is new information since the user missed a week, only the new information is shown. In some embodiments, a history of supplemental information is kept, so that the user is able to search and/or look through this information on demand.

In some embodiments, when numbers or charts are described in words (e.g. in a broadcast), supplemental graphics are displayed. In some embodiments, when a trend or statistics are mentioned, graphics are displayed to show the trend. For example, a reporter says, "housing prices have decreased for 5 months," and then supplemental information is shown that includes a chart of the past 5 months of housing prices by retrieving 5 months of data and generating a chart using a chart generation application. Providing the supplemental information is performed in any manner; for example, by finding the data and generating a chart and/or finding the chart. In some embodiments, context is used; for example, if the comment is "over the past 6 months," then today's date is used to find data going back 6 months.

In some embodiments, supplemental information is generated in advance of a broadcast based on a guest list for the show or other knowledge of the show. For example, the guest information such as views, biases, political party and/or any other information is able to be located and prepared beforehand for a political guest. Or for an actor appearing on a late night show, recent movies, events in the personal life of an actor, or other information is prepared in advance. In some embodiments, the advanced generation of information is performed automatically, and in some embodiments, the advanced generation of information is performed manually.

In some embodiments, supplemental information is based on personal conditions, personal traits, recent events and/or other information. In some embodiments, the information is able to be taken from a social networking site (e.g. Facebook®) or a site/implementation such as Twitter. For example, if a user indicates his mood on a social networking site, that information is able to be used in providing supplemental information. In some embodiments, the supplemental information is used in generating a suggested list of channels and/or programs for the user. For example, if the user indicated "depressed," a list of comedies is presented to the user. In another example, if the user indicated "depressed" and "conservative," comedies with a conservative slant are presented (or at least presented first in a descending order starting with the most conservative). The supplemental information is able to be used in presenting advertisements to the user in combination with or without other elements described herein. In some embodiments, the information (e.g. mood) is fact checked.

In some embodiments, when a word or phrase is mentioned (e.g. in a movie, on the news, in a television show, in person, in a discussion, on the Web and/or elsewhere), supplemental information is provided regarding that word or phrase. In some embodiments, only words or phrases that are included in a data structure (e.g. database) to provide supplemental information are used. In some embodiments, common phrases (e.g. don't look a gift horse in the mouth) are used. In some embodiments, only words and phrases deemed to be "not well known" are used. For example, if a movie makes a reference to an obscure object or person, supplemental information is provided so that the user understands what or who that object or person is. As described herein, the word or phrase is able to be searched for in a data structure, the web and/or any other source, and the result of the source is returned (e.g. a definition of the word).

In some embodiments, a data structure, for example a database, a table or any other data structure, is used to search for and present supplemental information. In some embodiments, supplemental information is based on subsequent searches.

Importance/Relevance

In some embodiments, broadcast information, stories, articles, or other content is rated and/or classified in relation to a user. FIG. 13 illustrates an exemplary listing of headlines with an importance rating according to some embodiments. In some embodiments, the content is rated based on an importance or relevance to the user's life or based on the user's interests. In some embodiments, the importance is selected by the user, and in some embodiments, the importance is based on standards of a group of people (e.g. neighborhood, town, state, country) such as community standards. For example, a community may establish the economy as the most important topic, followed by national security, then taxes, and other items following. In some embodiments, a combination of community standards and user selections is used to determine importance. Thus, content focused on lower priority (less important) items is rated lower than higher priority (more important) items. In some embodiments, content is presented to users based on the ratings (e.g. higher rated articles are presented at the top of a list to a user). In some embodiments, content that falls below a threshold is not presented to a user. In some embodiments, the user sets the threshold and/or specifies which kind of content not to show. For example, articles about Presidential wardrobes are not displayed to users where the user's importance ratings have such content below the user's threshold. In some embodiments, users are able to search based on the importance rating. In an example of a user-specified rating, a user selects lifestyle choices as the most important topic followed by the environment. In some embodiments, user-specified ratings are based on social networking site information, search information, preferences, favorites, city or state of residence, and/or other selections. For example, if a user searches for economic data often, then the economy is designated as an important topic for the user. In some embodiments, content is rated using multiple topics. For example, an article is rated as to how religious it is, how economic-related it is and how environmentally-conscious it is. In some embodiments, the rating in relation to importance to a user is used in combination with other ratings to provide a more complete rating. For example, an article is rated highly (e.g. 10) in importance because it involves unemployment and creating jobs, but it is rated poorly (e.g. 4) for its lack of accuracy, so the combined rating is a 7 on a scale of 1 to 10. In some embodiments, the separate ratings are presented separately (e.g. article is a 10 for importance and a 4 for accuracy). Any rating indication is able to be used (e.g. 1-10, A-F, a rainbow gradient of colors, or any other indication). In some embodiments, classification of content is determined based on keywords found within the content and/or any other classification. For example, if an article uses economic terms such as unemployment, stimulus, and taxes, the article is able to be classified as related to the economy. In some embodiments, content is able to be classified in one or more classifications. In some embodiments, the rating and/or classification of content is performed by monitoring, processing, keyword searching, and indicating. Keyword searching includes searching within the content for keywords. In some embodiments, monitoring or processing includes keyword searching and/or detection. In some embodiments, the rating and/or classification is performed automatically. In some embodiments, the rating and/or classification includes fact checking, and in some embodiments, fact checking is not performed. In some embodiments, there are classifications and one or more levels of sub-classifications. For example, a news broadcast that uses the terms: "unemployment," "stocks," and "taxes" is able to be included in the class "economy" and the subclasses "stock market" and "employment." The importance rating is indicated next to a title, displayed at the beginning of a television program, displayed in the information of a television program guide, displayed on a mobile device, and/or any other indication. In some embodiments, the classifications are based on general topics including, but not limited to, politics, sports, entertainment, finance and others. For example, if a user has no interest in sports, the user is able to place that at the bottom of the importance list. Using the sports example, "sports" could be the overall classification with specific sports (e.g. hockey, baseball, basketball, football, golf) as sub-classifications, and NCAA® football and NFL® football as a further level of sub-classification. In some embodiments, the position of the article (e.g. pro/anti) affects the importance to a user.

In some embodiments, a likelihood of importance is indicated to a user and/or used to determine the importance of an article, where the likelihood is based on the percentage of the population the article affects. In some embodiments, the position of the article (e.g. pro/anti) affects the likelihood of importance. In some embodiments, importance is based on what is trending now (e.g. what people are searching for, texting about, and/or other popularity based data).

In some embodiments, importance to a user automatically increases or decreases depending on the number of content (e.g. articles and television shows) presented to and/or selected by the user. For example, a user selects many "economics" articles; therefore, they are likely important to a user, thus the importance rating increases with time. In another example, a user has seen 10 television clips about the royal wedding, and the importance rating decreases with time since the user is likely tiring of the story.

In an example of an importance rating being implemented, a website displays titles of 20 articles. The user viewing the website has selected taxes, environment and foreign affairs as most important to the user. Three of the articles are rated as 100 s (scale of 1 to 100) on the importance scale since they are focused on taxes (e.g. tax-related keywords are detected), 5 are rated as 99 s since they are focused on the environment and 1 article is rated a 98 since it is focused on foreign affairs. The remaining articles fall below the user's threshold, and are grayed-out or not shown, so that the user is able to focus on articles important to him.

Figure 14:
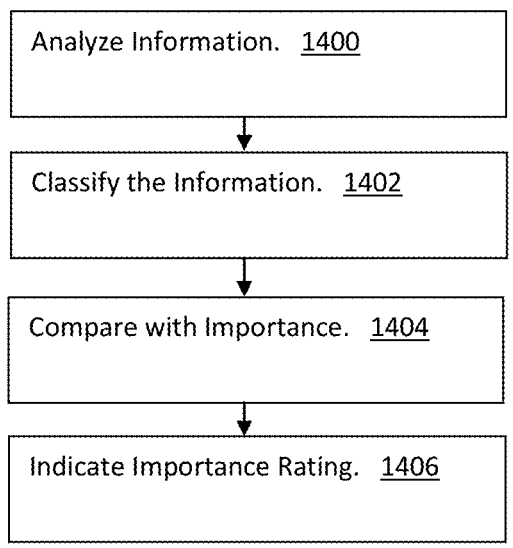
FIG. 14 illustrates a flowchart of a method of determining an importance of information according to some embodiments.

FIG. 14 illustrates a flowchart of a method of determining an importance of information according to some embodiments. In the step 1400, information (e.g. an article) is analyzed. For example, keywords are searched for in an article. To further the example, keywords are compared with a database that classifies the keywords. For example, a database specifies that "global warming" is in an environment class, and "gun control" is in a constitutional class or a 2nd amendment class. In the step 1402, the information is then classified based on the analysis. For example, an article which uses the words or phrases, "pollution" and "global warming," is classified as "environmental." In some embodiments, information is classified in multiple classes. For example, if an article discusses guns and the environment, the article is classified in a "guns" classification and an "environment" classification. In some embodiments, the information is classified in only one classification, based on the most relevant classification. For example, if an article contains 10 keywords related to war and only 2 keywords related to the environment, the article is classified in a "war" classification. In some embodiments, the classification includes a strength rating. For example, the percentage of occurrences, number of occurrences and/or another analysis is used to determine how strongly the article is classified. Furthering the example, an article is 90% composed of keywords related to war, thus, the article is given a "strong" rating of being related to war. In another example, a lengthy article only mentions the environment once; the article is given a "weak" rating of being related to the environment. The strength rating is able to be used in additional calculations in determining importance and/or separately displayed. In the step 1404, the classification of the information is compared with an importance, where the importance is able to be user-defined, based on standards or a combination. For example, a user is recognized and has defined his "important" items to be the environment, the economy and sports. Furthering the example, if an article (e.g. environmental article) matches the user's most important item, the article is rated a 10 (e.g. most important). In some embodiments, an importance rating includes a user rating plus the strength of an article. For example, a user rates the environment as his top priority, and an article is focused on the environment, the article is rated as most important, but a second article merely mentions the environment, the article is rated as moderately important. In the step 1406, an importance rating is indicated based on the comparison in the step 1404. For example, since the user indicated environment as the most important topic to him, and an article is determined to be about the environment, the article is given an importance rating of 10, which is displayed near the headline as is shown in FIG. 13. In some embodiments, fewer or more steps are implemented. Furthermore, in some embodiments, the order of the steps is modified.

In some embodiments, a channel is automatically changed when a television program discusses a story that falls below the user's importance threshold, for example, by determining the importance of the story, comparing the importance rating with the threshold, and if the importance rating is or falls below the threshold, the channel is changed. In some embodiments, the channel is changed to a story that is most important to the user. For example, a user has selected 3 topics—economy, sports, weather, and the user is watching News Channel A, when the sports segment ends, and goes to a story about fashion, so the television automatically switches to Channel B which is discussing the economy. To make the switch, content on all or specified channels is monitored and given an importance rating. In some embodiments, a video is changed in a similar manner to changing a channel. For example, if a website displays videos, and the current video is below an importance threshold, the next video is presented. Similarly, a radio station or other program is able to be automatically changed based on a user's importance threshold.

Bias

In some embodiments, a monitor of news stories and/or articles determines if a story and/or article is being ignored or overanalyzed. For example, if 3 of 4 news networks cover a story, and the fourth news network does not cover the story or barely reports on it, a notification or alert is presented to inform the user that he is missing the story. This is able to be implemented by comparing the stories, for example, comparing keywords or other information in the stories. This will help provide users with a full scope of news knowledge. In some embodiments, the notification includes a link or a guide to change the channel, so the user is able to see or hear the story. In a similar but contrasting manner, in some embodiments, stories are monitored to determine if they are over reported. For example, if the same story is played on all stations, every 10 minutes, a notification or alert is presented to inform the user that the story is being over reported. In some embodiments, users are able to rate stories under reported, over reported or other ratings. For example, users are able to text a rating. Other methods of rating a story are possible as well. News networks are then able to modify the presentation of news based on users' ratings. In some embodiments, users register to be able to interact with a show or website. In some embodiments, users have to qualify (e.g. pass a test) to be able to rate and/or post comments. For example, in some embodiments, users must prove they are not "trolls" by accurately predicting the factual accuracy of several statements.

In some embodiments, identifying framing of data including, but not limited to, spin, slant, bias or any other framing or manipulation of data is implemented. Identifying framing of data is able to be done in any manner. In some embodiments, a data structure (e.g. a database) is used to store biases including, but not limited to, biased information, biased entities, and other biases. In some embodiments, the bias of the speaker is able to be used to identify framing. For example, if a speaker is known to be an ultra-conservative, that knowledge is able to be used to label framing. In some embodiments, a comparison with other people's take on a subject is used to determine spin. In some embodiments, the comparison is based on peers or groups. For example, news reporters are compared with other news reporters. In an example, if 9 commentators label a speech as "well done," and 1 commentator labels the speech as "poor," the 1 commentator's comments are able to be labeled as "unrepresentative" or "minority view." Further in the example, the information that 9 commentators view something one way and the 1 commentator views it another, is able to be used with additional information (e.g. that the 1 commentator is an ultra-liberal), and the 1 commentator's comment is labeled as "liberal spin." In some embodiments, safeguards are able to be implemented to prevent manipulation such as a group ganging up against an individual. Additionally, the tone of the commentator, the number of factual inaccuracies by the commentator, and any other information is able to be taken into account to properly label the comments as spin, slant, bias or some other classification/category. In cases of subtle spin, such as where a commentator starts off by describing a radical element of a group and then generally applies a broad stroke to the entire group, that is able to be detected as well. For example, antecedent basis is monitored and checked. In an example, a commentator says, "the far right is a bunch of warmongers," and then later, the commentator says, "the right loves to go to war." While the first statement may be true, the second statement is clearly an overly broad statement and is able to be labeled as "misleading" or is able to be clarified by adding "far" to the statement to indicate "far right." Entities including, but not limited to, individuals, commentators, networks, companies and any other entity are able to have labels or other information to help determine a bias or slant. For example, commentators, channels, networks, websites and blogs are able to be labeled with political terms or other terms as described herein. Companies are able to be labeled with political terms as well or other terms including, but not limited to, anti-environment. Not only do the labels help identify to a viewer or reader where the information is coming from, but the labels are able to be quantified to perform additional calculations including, but not limited to, identifying spin. As described herein referring to the slant rating, the labels are able to be determined using any data including, but not limited to, the number of errors, types of errors, statistical analysis, surveys, analysis of content, analysis of past performance, and any other information.

In some embodiments, the fact checker monitors a news story for bias or one-sidedness and presents helpful information to provide a full story. For example, if a news report discusses a police shooting of a suspect but leaves out the aspect of the story that the suspect fired at the police first, the fact checker is able to determine the incompleteness of the story and provide supplemental information in any of the manners described herein (e.g. a text message of the missing information to the user's mobile device, an alert that there is more to the story, an email, or any other method). In an exemplary implementation, a database with full details of a story is maintained to compare with the presented story, and any information not mentioned in the presented story is able to be supplemented. In some embodiments, the full detail database is compiled by searching sources. In another example, if a news program only discusses negative aspects about an issue, or if a news program only discusses positive aspects about an issue, such one-sidedness is detected. In some embodiments, to determine the one-sidedness, the underlying data of the story is monitored (e.g. the stock market) and the show/program is monitored, and then they are compared so that if the underlying data changes but the show/program does not report the change, one-sidedness is detected. Furthering the example, if a show, for 3 days in a row, mentions the stock market is down, and then the show is subsequently silent when the stock market is up for 4 days in a row following that, such a characterization is able to be detected. In some embodiments, the information is also presented to users (e.g. scrolling text saying, "although this program mentioned the stock market being down 3 days, the stock market has been up 4 days since then"). In some embodiments, such information is able to be tracked and used to rate the news program.

In some embodiments, a caller (e.g. of a radio show) or commenter (and/or his comments) is fact checked to determine the quality of the caller/commenter. For example, the arguments of the caller are classified as good/poor arguments, the grammar is classified, and other information is taken into account to determine the quality of the caller. Multiple callers are able to be analyzed to determine if the callers are being selected to poorly represent one side of an argument or a group of people. For example, if a radio show selects callers with outrageous arguments for one side, and reasonable arguments for the other side, such a bias is able to be detected and indicated to users (e.g. listeners).

In some embodiments, supplemental information regarding what percentage of the population agrees or disagrees with a position is displayed. For example, a commenter says, "liberals believe in socialism," and in response, an indication of "This view is shared by 20% of people who consider themselves 'liberals' and 5% of people who consider themselves 'democrats' is shown." In some embodiments, specific phrases are monitored to implement this, such as "liberals believe" or "liberals think."

In some embodiments, bias or other classifications are determined or tracked based solely on analyzing headlines, titles, or other headings.

In some embodiments, polling, ratings or other information are fact checked or analyzed for bias. For example, if a news organization says they cover stories with a fair representation of each side since they mentioned each side the same amount of time, further analysis is able to be performed to determine if each time they had a bias towards one or the other. And a clarification of bias is able to be presented. In some embodiments, a classification and an indication of sources, polling, organizations and/or other entities is presented. For example, if a commentator cites the XYZ poll, an indication that the XYZ poll is a left-leaning poll is indicated.

In some embodiments, analysis and/or comparison of the fact checking data/results of networks, shows, web sites or other presenters of data is performed. For example, Channel A is found to lie (or err) 20 times/day and have 1 stale story/day, and Channel B lies 5 times/day and has 0 stale stories/day. Other data is able to be tracked including, but not limited to, historical data and improvements or trends. The results and other information are able to be stored, sorted, compared, analyzed, searched, displayed (e.g. chart/graph/numerical), and/or used for many different purposes. The information is also able to be used to generate a results rating. For example, channels are rated based on the number of errors, number of corrections, timeliness of correction, number of stale stories, and/or any other factors. The results rating is able to be in any form including, but not limited to, 1-5 stars, A-F, 1-10 or 1-3 diamonds. A slant rating is able to be used to indicate if a channel, show, site or other item has a political slant including, but not limited to, liberal, conservative, moderate, or any others. Users are also able to search, sort or perform other tasks based on the slant rating or other information. For example, users are able to set, sort or search channels, web pages, blogs, shows/programs and others, based on the comparison of a results rating such as searching for all cable news programs with a 4 star rating or higher. The searches are able to be generic or more detailed. For example, a user is able to search for all shows that have 3 stars or better. In an example of a specific search, a user searches for all shows with 4 stars or better, with a moderate rating, in channel range of channels 2-10.

Television/Video/Other Media

In some embodiments, archiving is implemented. For example, television shows are recorded or converted to text and recorded. In some embodiments, only fact checked aspects are archived. In some embodiments, only fact checked items that are classified a certain way (e.g. false) are archived. In some embodiments, the archives include groupings. For example, false statements are in one group, hyperbole is in another group, and other items are in other groups.

In some embodiments, the fact checking is used for analysis of commercials. For example, if a law firm advertisement is displayed, the fact checker is able to provide statistics about the law firm including, but not limited to, where the attorneys went to law school, bar ratings, articles about the law firm, the law firm's website link, provide comparison results such as similar law firms and/or any other relevant information. In another example, a restaurant displays an advertisement that is broadcast nationally, and the nearest location is able to be displayed by determining the user's location (e.g. the device location via GPS and/or IP address). Furthering the example, ratings, menus, nutritional information, allergen information and/or any other information for the restaurant is made available or displayed. Again furthering the example, a user's mobile device automatically maps directions to go to the nearest location from the user's current location. In some embodiments, the fact checker is used to determine the validity of commercials. For example, if a commercial claims the advertised product is the best, the fact checker is able to compare the product by searching for ratings on comparison websites, and/or any other resources to determine if the commercial is true. The fact checker is also able to present additional information to provide a user more detail. For example, an automobile commercial claims the displayed vehicle is the #1 rated vehicle. The fact checker verifies the claim and also informs the viewer that the vehicle is #1 rated for men ages 19-29, but overall, a competitor's vehicle is #1 rated. The fact checker is able to provide automatic comparison shopping. Any commercials or advertisements are able to be fact checked including, but not limited to, print, broadcast, digital/online and mobile-based. In some embodiments, a commercial or advertisement is detected based on a product, a company and/or language in the commercial/advertisement. In some embodiments, a commercial/advertisement is detected using another implementation.

In some embodiments, users are able to post comments directly to a televised show or other video. For example, users send comments to a television network or show producer. In some embodiments, the network filters the comments. The comments are able to include citations proving or disproving a speaker's comment, or labeling the comment in another manner. As described herein, in some embodiments, comments are displayed to a designated group of users. In some embodiments, users are able to be in more than one group.

In some embodiments, group video viewing is implemented. For example, a specific group of users watch a video at the same time and are able to post comments and perform other fact checking aspects on the video. Users are able to invite others to join the group. In a further example, a set of co-workers form a viewing group to watch the State of the Union Address. While the State of the Union Address is displayed, the users are able to input (e.g. tweet, instant message, text) comments about the speech which are shown to the other users in the group. If the automatic fact checker is implemented, then the speech is automatically fact checked as well. If the automatic fact checker is not implemented, users are able to flag items to be fact checked. Additionally, users are able to flag other users' comments, or users' comments are automatically fact checked, depending on the implementation. The groups are able to be as small as two people (e.g. husband and wife viewing the same video from different locations) or as large as an entire population (e.g. billions). The groups are configurable in many ways. Users can be added to groups, deleted from groups, be in multiple groups, and any other grouping features are able to be implemented.

In some embodiments, television analysis is performed. For example, the fact checker monitors video and audio, converts the audio to text and analyzes the text to provide information of what is going on in the video in real-time. The fact checking process is able to occur in the background, so that the user is able to view other channels. By monitoring and analyzing the video in the background, the fact checker is able to then inform a user when it detects information the user is looking for. For example, there is a sports show on Channel 50 which discusses all different sporting events such as baseball, golf, soccer and basketball, but the user simply wants a recap of golf scores. The user is able to input a search string (e.g. golf), or the system automatically knows what to look for based on previous searches or other information (e.g. trending information), or another implementation is used to monitor. The fact checker analyzes the text of the show for the word "golf" or a related word/name/item such as par, U.S. Open, Tiger, and when the word is found, the user is alerted that his topic is being displayed on that channel, so that the user knows to change to that channel This enables users to avoid having to constantly switch back and forth to find a desired segment. In some embodiments, the information monitored is an actor, a location, and/or any other information. In some embodiments, images are monitored (e.g. a user selects an image of an actor, and that image is compared with the broadcast information to determine a match). In some embodiments, when the correct segment is being displayed, the channel automatically changes for the user. In some embodiments, a picture-in-picture window of the other channel is displayed. In some embodiments, an audible or other alert is presented to inform the user. In some embodiments, the fact checker is able to be used to alert a user that a commercial is over, and that the desired show has returned. In some embodiments, the fact checker is used in conjunction with a recording device, for example, a Digital Video Recorder (DVR) (e.g. TiVo®). After audio is converted to text, a search is able to be performed on the text. For example, an entire sports show is recorded and converted. A search for "Tiger Woods" is performed by the user. The text is searched, and when the phrase "Tiger Woods" is found, the video begins playing from that point in the video (e.g. in the video, a commentator mentions the name "Tiger Woods"). In some embodiments, every instance of the search phrase is found, so that the user is able to jump to each instance of the search phrase in the video. For example, if "Tiger Woods" is discussed at 5:59, 10:32 and 50:21 of the video, the user is able to hit a "Next" or "Previous" button to navigate to each point in the video where "Tiger Woods" is mentioned. Any search techniques and/or features are able to be implemented. In some embodiments, instead of a conversion of audio to text, text is provided in advance or during the show. For example, networks are able to provide text from the show in a searchable form. In some embodiments, converted text or other text is also able to be used to predict future television information. For example, a news program states that stories about A, B and C will be shown tonight. The fact checker is able to determine when the specific stories of A, B and C will actually air, so that users are able to avoid stories they are not interested in. The television analysis is also able to be applied to other forms of media including, but not limited to, radio, Internet webcasts, videos and any other media. For example, the fact checker is able to monitor some or all radio stations for a desired song and when that song is found, the station switches to play that song. The search is able to be used to find a song by a title, artist, based on several words of the song (e.g. first three words), or some other method.

In some embodiments, re-runs or replays of shows do not use additional fact checking For example, if a show is typically displayed at 5 pm and then replayed at 8 pm, the 8 pm show is able to use the previous fact check information from the 5 pm show. In some embodiments, additional information is provided in the 8 pm show that was not provided in the 5 pm show. In some embodiments, analysis is performed to confirm the shows are the same.

In some embodiments, the fact checking is performed using an original broadcast and then displayed during a repeat broadcast or a recorded broadcast. In this implementation, the fact checking is able to be in real-time or non-real-time, automatically or not automatically. For example, a show is broadcast at 5 pm, and fact checking occurs. Then, when the show is re-broadcast at 8 pm, fact checking results/information is presented automatically and in real-time during the re-broadcast. Similarly, when a re-broadcast occurs via the Internet, such as on a broadcaster's website, results/information is presented during the re-broadcast. Although this would not prevent misinformation from being spread in the initial broadcast, the fact that any re-broadcasts would catch any misinformation could potentially discourage misinformation from being presented in the initial broadcast. In an exemplary manual implementation, viewers watching the 5 pm telecast flag information as misleading, incorrect, unclear and/or any other characterization, then fact checking and/or other analysis is performed, and then at a later telecast (e.g. the 8 pm telecast), corrective and/or supplemental information is displayed automatically to the viewers of the later telecast at the appropriate times. The appropriate times are able to be determined in any manner, including, but not limited to, monitoring for keywords (e.g. database includes keywords to monitor and corresponding corrective comments to display), monitoring for a designated time (e.g. each time a user flags information, a timestamp is made which is then used to display the corrective comments) and/or any other method.

In some embodiments, polling occurs during a broadcast and then is posted during the re-airing of the show. For example, a poll is presented, "conservatives, do you agree with Commentator A's position," and people respond, and then the results are shown that "earlier polls show X % polled agree with this position."

In some embodiments, the fact checking system is used to avoid or correct a mistake presented. For example, in the past, news networks have accidentally posted graphics with incorrect statistics. The fact checking system is able to preemptively check the graphics or post-display check the graphics, so that the poster (e.g. network) is able to correct the error before broadcasting the error or quickly thereafter.

In some embodiments, automatic prediction tracking is implemented. For example, a commentator says, "President Z is going to lose in 2012." That comment is stored, and once a result is determined (e.g. the election ends), the accuracy of the prediction is determined (e.g. using the fact checker). In some embodiments, the prediction determinations are stored, used for statistics, to generate prediction ratings/accuracy ratings and/or for any other purposes. For example, commentators or any other entities that make predictions are able to have prediction ratings so that viewers are able to see how accurate commentator's predictions are. For example, when a commentator is shown on television, a prediction rating is shown (e.g. correct predictions 5, incorrect predictions 10) to indicate to viewers that this commentator's predictions do not usually come true. The prediction ratings are able to be in any form such as grades (A-F) or any other rating scheme. In some embodiments, multiple categories of predictions ratings per entity are implemented. For example, a sports analyst may predict football well but not baseball, so his rating for football is high but for baseball is low. Examples of entities that make predictions, guesses or estimates include but are not limited to, commentators, weathermen, stock commentators, news commentators, businesses, sports commentators, real estate commentators, analysts, financial commentators, entertainment commentators, reality show hosts/judges, and/or any other entity.

In some embodiments, the fact checking system is used to rate weather predictors. For example, if one channel is wrong more often than another, viewers would be informed of this and could change their viewing habits accordingly. In some embodiments, viewers are given a list of alternatives. For example, a list of channels with accuracy percentages is displayed.

In some embodiments, a stock picker is fact checked to determine the accuracy of stock pickers. For example, if an online site boasts about being able to select stocks, the fact checker is able to monitor the picked stocks and then provide an accuracy rating for the site, so that users are able to use the most accurate site. Similarly, sports analysts are fact checked and tracked to indicate the accuracy of the sports analysts' predictions/picks.

In some embodiments, the fact checker indicates a status of a comment to the host/interviewer of a show (e.g. so that the host is able to ask a follow-up question). In some embodiments, the fact checker comes up with the follow-up question automatically (e.g. follow up question is displayed on teleprompter). For example, if a host asks a guest what the guest does not like about the President, and the guest responds that "taxes are too high." The fact checker is able to determine that the current President has lowered taxes since becoming President, and automatically generate a follow-up question of, "since the President has lowered taxes, is that a valid complaint about the President?" In some embodiments, the follow-up question is based on searches performed by the fact checker. In some embodiments, a database of potential follow-up questions is implemented and based on the answer, a follow-up question is selected.

In some embodiments, an avatar or other representation of an entity is displayed on a show (e.g. a television show or webcast) to present the fact checking information. For example, a political commentary show has guests, and one of the guests is able to be an avatar that comments when one of the other guests or the host makes a misstatement or some other statement that warrants commenting. The avatar is able to be computer-generated or any other type of generated avatar.

In some embodiments, the severity (e.g. severity of incorrectness, severity of bias, severity of political slant) of a statement is indicated with the result. For example, if a person says, "Rhode Island is the largest state," a severity rating of 10 is displayed as the statement is completely wrong since Rhode Island is the smallest state. In another example, if a person shows extreme bias, a bias severity rating of 10 is displayed. The severity rating is able to be indicated in any manner, including, but not limited to, 1-10, by grades including, but not limited to A-F, bright colors indicating severe and dull colors indicating not severe, imagery/pictures, audio (e.g. "wow!" for severe, "wah wah" for not severe, or a loud chime for severe, a quiet chime for less severe), or any other rating, grading or indicating system.

In some embodiments, the fact checker is used to inform a person (e.g. a host) that he made a mistake. For example, a host states the U.S. is $15 Billion in debt, and a chime and/or other audio is emitted in the host's earpiece, letting the host know that he made a mistake. In some embodiments, the chime is merely just a short chime where the host has to figure out what the mistake was, and in some embodiments, the audio is a correction (e.g. "Trillion" in this example) or a chime linked to a teleprompter that could display accurate information or incorrect statement. In some embodiments, the indicator to the person is visual (e.g. a flashing red light), tactile (e.g. vibration), or any other indicator.

In some embodiments, a host, guest or other entity is provided additional information (e.g. statistics) by the fact checker during a communication. In some embodiments, additional information is indicated when questionable information or other information is presented. For example, in a debate, debater A is able to have the fact checker running while debater B is making comments. Debater A is then able to use the fact checked information to debate better.

In some embodiments, using the fact checker, if a commentator (e.g. guest) is found to have misstated facts a specified number of times (e.g. 3 times) within a specified period of time, an action is automatically taken against the guest (e.g. the guest's microphone is cut off for a period of time). For example, a guest is on a political commentary show, and he makes 3 factually inaccurate statements on the show, his microphone is cut off (silenced) for 1 minute. In addition to fact checking, other events are able to contribute towards taking the action. For example, if a guest keeps interrupting other guests, each interruption could contribute toward taking action. For example, a guest interrupts once and makes two factually inaccurate statements; those 3 events cause the action to be taken against the guest. Another example of an action is shining a colored light (e.g. a red light) on the entity for a period of time. In another example, when a score is maintained to determine the winner of the argument on the show, an action includes disqualifying a participant or deducting points due to improper conduct. The action is able to be taken against any entity, not only a guest, and any actions are able to be taken.

In some embodiments, points are awarded to hosts, guests, callers/commenters and/or others based on their arguments to determine who wins an argument. The points are able to be awarded based one or more factors including, but not limited to, factual accuracy/inaccuracy of the arguments, conduct, viewer voting, judge voting, and/or any other factors. The point tally is able to be kept running while the argument occurs and/or indicated at the end of the argument. For example, a political commentary show includes a segment with a host debating a guest on a controversial topic. The host and the guest each go back and forth presenting their arguments. The fact checker automatically monitors, processes, and fact checks the arguments and then gives points for factually accurate information, and deducts points for inaccurate information. The fact checker also determines if improper conduct occurs, for example, cutting off the other or filibustering (e.g. not answering the question directly), and deducts accordingly. While the segment is airing, or quickly thereafter, users are able to vote (e.g. by text or any other implementation) for who is winning/won the argument. A formula is able to be implemented to add the votes with the fact checker results to determine a score (e.g. whoever wins each argument receives a point which is added to the fact checker points). Then at the end of the segment or some other point in the show, the results are displayed, indicating a winner of the argument (e.g. the one with the most points). In some embodiments, a host is given a handicap (e.g. host starts with a 1 point reduction) in an attempt to balance the likely bias of his viewers. In some embodiments, users are able to select the factors used in determining a winner. For example, if a user does not like the idea of other users affecting the outcome, the user is able to specify that the winner is determined solely based on the fact checker results.

In some embodiments, when an entity communicates (e.g. speaks or writes) or is displayed, donors and/or contributors who have contributed to him or his campaign and/or charities or other entities he has contributed to are displayed. For example, a politician is shown on television, and a list of the top 10 contributors to his campaign is displayed on a user's mobile device. In some embodiments, only contributors related to a topic (e.g. discussing energy, display oil company contributions). Any amount of information about the contributors is able to be displayed (e.g. how much in contributions, when the contributions were made, and other information). The contribution information is able to be determined using a data structure (e.g. a database) which stores entities and related contribution information, via searching as described herein or any other method.

In some embodiments, a list of names of supporters and/or dissenters of information is presented. The list is stored in a data structure such as a database and/or is based on previous comments, writings and/or other information. For example, a guest on a talk show makes the comment: "lower taxes creates jobs," and a list of prominent people supporting that position is displayed.

In some embodiments, the fact checker is used to assist users in reading the fine print displayed in television advertisements. For example, the fact checker captures the fine print and allows the reader to display the fine print for longer than the normal display time. In another example, the fact checker allows the user to capture and enlarge the fine print so that it is more legible.

In some embodiments, to determine a character/actor/location/other information, a user takes a picture of a television screen, computer screen, mobile device screen or any other object/scene. For example, if a movie is being played on a person's television, the person uses his mobile device to take a picture of the screen, and then the mobile device is able to analyze the picture and determine the actor, movie being played, where the set location is, and/or provide any other information.

In some embodiments, when a poll is referred to, related polls are searched for and presented. In some embodiments, the polls are compared. For example, Political Program X only shows an XYZ poll that shows Candidate Z in the lead, but a similar poll (ZZZ poll) shows Candidate Y in the lead, then the ZZZ poll is also presented. Similar polls are able to be searched for in any manner, including, but not limited to, same or similar dates, same or similar topics and/or any other manner.

In some embodiments, a mobile device (e.g. smart phone) is used to scan a television advertisement to obtain information. For example, if a user is watching television and a commercial appears, the user holds his mobile device with camera so that the camera is able to scan the commercial, and then the user is able to click on an item in the advertisement or entire advertisement to receive additional information regarding the item and/or advertisement. In some embodiments, the user is able to transfer the advertisement to his mobile device (e.g. by pointing the camera of the mobile device at the advertisement and selecting "transfer" or "capture").

In some embodiments, fact check information and/or supplemental information is indicated while a user is fast-forwarding, pausing and/or taking another action with a video. For example, while a user is fast-forwarding a DVD, supplemental information is displayed to the user.

In some embodiments, a DVR records a show with or without fact checked information or supplemental information, but fact checked information and/or supplemental information is determined in the time between the initial recording of the show by the DVR and when the user views the recorded information, so that when a user views the recorded information, the fact checked results and/or supplemental information is displayed. In some embodiments, the fact checked results and/or supplemental information is stored on the DVR, and in some embodiments, the information is stored on another device. In some embodiments, the fact checked results and/or supplemental information is updated incrementally as new information is determined.

In some embodiments, supplemental information that includes a fusion of genres is implemented. For example, a user is watching a political commentary show and comedic supplemental information is provided. The determination of the supplemental information to provide is the same as or similar to other implementations described herein. In some embodiments, a database of keywords and corresponding actions to take or information to display is maintained, or the actions or information are based on searches performed. For example, a database includes a keyword "global warming" and a joke related to global warming is included to correspond with that keyword. Then, as the information is monitored, and the keyword is detected, the joke is presented to the user (e.g. on his mobile device or television). In some embodiments, more information is used in determining what supplemental information is displayed. For example, user-related information is used including, but not limited to, age, gender, location, political leaning, and any other information. Furthering the example, if a user is conservative, a joke linked to global warming would be critical of global warming; whereas, a joke for a liberal user would be critical of those who do not believe in global warming. In some embodiments, a personalized viewing schedule is implemented. The personalized viewing schedule is able to be implemented by switching among channels, using a video recording system (e.g. DVR or TiVo®), using online video, using radio and/or any other implementation. For example, after the fact checker monitors and processes a 10 pm news program, in conjunction with a DVR storing the news program, the fact checker displays a list of topics/stories covered in the news program. Furthering the example, the 10 pm news includes a stock market report, a homicide report, a weather report, a sports report, and a story about local art projects. The user is presented these items (e.g. in a list), and then the user is able to select and/or rank the stories to watch in order or select only particular stories to view. For example, the user chooses to watch the sports report, the stock market report and the weather report, and then only those stories are shown to the user. In some embodiments, the items (or segments) are pre-sorted based on previous selections by the user, user preferences, friends' selections (e.g. Facebook contact recommendations), popularity, and/or any other bases. In some embodiments, the list of stories is displayed on the screen, so that the user is able to see what stories are upcoming.

In some embodiments, the fact check information and/or supplemental information is displayed as part of and/or during a commercial break.

In some embodiments, a fact checker button is implemented for turning on/off the fact checking system. The fact checker button is able to be located on a remote control, television, mobile device and/or any other device and is able to be a hard button, soft key, menu selection, or any other implementation.

In some embodiments, the fact checker is implemented such that the monitoring, processing, and fact checking are performed automatically, but a user (e.g. moderator) is also involved with the indicating such that it is performed semi-automatically. For example, a person's speech is monitored, processed and fact checked automatically, and then the results of the fact check are displayed to a moderator who is able to determine which fact check results are indicated (e.g. displayed to viewers). For further example, the fact checker finds that the speaker misspoke and said $100 Billion instead of $100 Million. The fact checker presents this to the moderator who then approves the correction which is then posted to viewer's screens. Although this slows down the process slightly, the delay will be minimal such that the indication is still presented within several seconds and possibly even within one second.

Additional Structure and Execution

In some embodiments, a device such as a mobile device is used to perform a fact check of an item through the use of the device's camera or other sensor. The mobile device is able to scan (e.g. merely point camera without taking picture), take a picture, take a video, or any other method of acquiring the content of the item. For example, a mobile phone is used to take a picture of a print newspaper and perform a fact check of the newspaper. The writers of the articles are able to be rated as described herein. The newspaper or magazine is able to be rated as described herein. For example, tabloids are viewed as unreliable or are given less credibility than a standard newspaper. Any print material is able to be fact checked, including, but not limited to, newspapers, magazines, books, billboards and pamphlets, including any advertisements within. In some embodiments, the device is able to fact check an item including, but not limited to, a purse, dress, watch, ring, shoe, suit, clothing, or any other item to determine the brand of the item and/or if the item is a replica. For example, a user directs the camera of his mobile phone toward a watch and the fact checker determines if the watch is an original Rolex or a replica. The fact checker is able to perform the check in any manner such as determining that the watch says Molex instead of Rolex, or by a picture comparison of the acquired watch and certified watches stored in a database, comparing distinct features of a genuine article such as stitching and/or hardware/material used, or any other comparison.

In some embodiments, the item determination is performed on items on television, the Internet or elsewhere. For example, during an awards show, the item determination posts information about the dresses being worn, including, but not limited to, designer and/or price. The fact checker is also able to perform person identification. Using the awards show example, an indication of who is being shown on camera is able to be displayed. As described herein, facial/body analysis or any other method is able to be performed to determine who people are. Additionally, character/actor/person determination is able to be performed. For example, if a commercial is being displayed, and a user is curious who the main actor is, actor determination is implemented to display the actor's information. In some embodiments, all character/actor information is displayed, only selected character/actor information is displayed, or any other configuration of information is displayed. For example, all names of actors on a television show are shown under each actor. In another example, a user specifically selects (e.g. by touchscreen or any other method of selecting) the actor to see information. The amount of information is also able to be variable. For example, as little as a name is shown or much more detailed information is shown including, but not limited to, biographical information, other shows/movies, ratings/reviews, links, character/plot summary (e.g. a summary of this character's involvement in the plot) and any other information. In some embodiments, information about when a specified actor will be on television next is displayed. For example, a user clicks on Actor A, and the user is informed that the actor is also in Movie Z, at 7 pm on Channel 263. For sports, some or all names of the players are shown on/near each player. In another example, a user specifically selects (e.g. by touchscreen or any other method of selecting) the player to see information. The amount of information is also able to be variable (e.g. game stats, historical stats, personal information, fantasy football stats, and any other information). The fact checker is also able to perform location recognition. For example, if a reporter is "on location," the fact checker is able to determine where that location is. The fact checker is able to determine the location by comparing the image with a stored image, by searching the credits (e.g. a movie specifies locations of shootings), by searching text of the transcript (e.g. newscaster earlier said, "we're on location live at x," and/or any other implementation. In some embodiments, after a location is determined, the viewer is able to pull up additional information about the location (e.g. historical information, current information (weather, prices of goods)). Character determination, location determination and any other determination is able to be implemented using any media including, but not limited to, television, movies, photographs (e.g. online photographs), videos (e.g. online videos), satellite information, prior news feeds, or any other media. In some embodiments, identifying the object is by comparing the object with other objects in the scene, finding a story/article about the object, or any other method of identification. Distances and/or sizes of objects within the scene are able to be determined with scene analysis.

In some embodiments, the fact checker checks for and indicates defamation, slander, libel, plagiarism, copyright infringement, trademark infringement, patent infringement, and/or other crimes. In some embodiments, when a crime is committed or may have been committed, the targeted person and/or someone else (e.g. the police) is contacted (e.g. an email or Tweet is sent with the criminal comment, who said/wrote the comment, and any other relevant information). In some embodiments, defamation or other crimes are determined by: determining the location of the speaker or victim, determining if the statement is false, determining state law and presenting the state law and statement to the victim or the victim's attorney and/or analyzing the law to determine if the law is violated. In some embodiments, additional elements are considered such as defenses to the crime. In some embodiments, other crimes/laws are fact checked by analyzing the law/statute/regulation/ordinance/cases/other information, analyzing the facts and determining a result. In some embodiments, a database of laws, cases and holdings is used to perform the analysis. In some embodiments, the analysis merely returns similar cases, so that the user is able to compare. In a same or similar manner, a disparaging comment is detected and reported (e.g. to the target of the comment). For example, if someone writes on a message board that Company XYZ is a terrible company, the comment, web address, citation, and/or any other information is sent (e.g. by email, Twitter or any other means) to the target of the comment. In some embodiments, future shows and/or news stories are based on fact checking results. For example, if users respond to news stories as overplayed, future newscasts will not include stories related to that topic. In another example, if users request more information about an aspect of the story (e.g. victim's race), future newscasts will include that information. In another example, if users rate a story as "biased," the future newscast will remove the bias.

In some embodiments, an indication on or near a headline, title, caption, talking point and/or other short phrase is implemented. For example, a rating of a story, article, news or any other information is able to be implemented. In some embodiments, the rating of the story is based on an automatic fact check of the story. In a further example, a title of an article is "Vaccines Proven Harmful," but the article uses studies that have been discredited and readers rate the article poorly, future viewers will see the article as "Vaccines Proven Harmful 0 Stars." In some embodiments, the indication is not near the headline or other phrase. For example, the indication is on a user's mobile device after scanning or taking a picture of a hardcopy title. In some embodiments, the indication is a characterization of the article. For example, the article is characterized as liberal, neutral or conservative. Other characterizations, ratings and indications are able to be implemented. In some embodiments, an indication of a better and/or opposing article, story and/or other information is indicated. In some embodiments, if a headline is determined to be misleading (e.g. by comparing the headline with the content of the article and/or based on user reviews), an indication of "misleading" is displayed near the headline.

In some embodiments, stories (e.g. articles, news stories, and other) are rated. For example, if users are tired of hearing about Story X, users are able to communicate that opinion. In some embodiments, broadcasters and/or reporters are able to receive the ratings information automatically, so that they are able to cut short, extend or otherwise modify the programming. In some embodiments, users are able to provide more specifics about the rating of the story. For example, a viewer is able to indicate she is tired of the slanted presentation of the story or the presentation of the lineup of stories (e.g. always making criminals looking like they were unfairly treated by leaving out important details). The ratings are able to be any form of ratings including, but not limited to, thumbs up/down, good/bad, 1-10, A-F, emoticons, a selection from a list of choices, and/or any other implementation.

In some embodiments, a self-checking system is implemented. For example, a mobile device application including, but not limited to, an iPhone® App, monitors a person's comments when he speaks, and if the person says something incorrect, the application alerts (e.g. chime, ringtone) the person. For further example, a dad is explaining geography to his daughter and says Alabama is West of Mississippi; the application chimes. In some embodiments, the application provides a correction, provides a citation and/or any other information to help the person. In some embodiments, the self-checking is able to be implemented to provide positive feedback for saying a correct statement, for example, as a learning tool or a game for children. In some embodiments, a quiz, a multiple choice program, or other testing material is implemented. In some embodiments, the fact checker fact checks a user's statement and then asks a question related to the statement. In some embodiments, the fact checker learns based on the result of the fact check to ask an additional question. In some embodiments, based on a series of statements by the user, the fact checker asks the user a question. In some embodiments, the self-checking system has the ability to only fact check a specified user (e.g. by voice recognition or some other recognition) so that other people's comments are not fact checked. For example, if a user implements a self-checking iPhone® application which monitors everything received by the iPhone® listening device, then while the user is walking on the street, conversations of others may be fact checked. If the user does not want these other conversations fact checked, the specified user implementation is able to filter received information, and only fact check statements made by the specified user.

In some embodiments, the fact checking is implemented in or as a search engine and/or a browser. Using a standard search engine, entering a statement such as "Alaska is the largest state" results in links being displayed on the screen which enable a user to then select a link where the user is able to verify if Alaska is the largest state. Using a fact checking enabled search engine, a user is able to enter "Alaska is the largest state" in the browser window, and the result of "True" appears. In some embodiments, links still appear as from a standard search engine, and next to or near each link appears a result including, but not limited to, True/False or any other indicators. In some embodiments, search engine capabilities are available in other software (e.g. word processors) to perform a fact check.

In some embodiments, the fact checking system is embedded or used with a word processor including, but not limited to, Microsoft® Word or any other software program. In some embodiments, the word processor highlights, underlines, circles, auto-corrects or performs another form of fact checking identification. In some embodiments, if the statement being fact checked could be corrected in more than one way, a user is presented with multiple options. For example, if a user types, "Texas is the biggest state," the user is able to be presented with "Alaska" as a replacement of Texas, or "second biggest state," to clarify that Texas is the second biggest state.

In some embodiments, the fact checker is implemented as part of an operating system.

In some embodiments, some or every tweet a person sends out is highlighted or color-coded based on the type of tweet. For example, different tweets are coded as factually correct, factually incorrect, spin, opinion, hyperbole, or any other characterization.

In some embodiments, email is fact checked. Depending on the embodiment, the email is fact checked before being sent out or fact checked when the email arrives in a user's inbox, or when the user opens the email. In some embodiments, when the user opens the email, the email is able to be provided marked up such that factually inaccurate statements are indicated, for example. In some embodiments, a user is able to send the email to a service, and the service returns a marked up version. The service is able to be local to the device (e.g. software running on a user's device) or could be external including, but not limited to, on the Web. The same or similar implementations are able to be used for SMS texts, MMS texts, audio texts, or any other communication. In some embodiments, an entire email or other message is indicated as "spam" or any other indication/label if it is found to be factually inaccurate. In some embodiments, a threshold is implemented to determine if the message is spam. For example, if the threshold is 10 inaccuracies, and 11 factually inaccurate items are found, then the message is labeled as spam.

In some embodiments, conversations are recorded for a time period (e.g. a night) so that they are able to be used later for comparison with a statement.

In some embodiments, a closed system of information is searchable, such as for a court case. For example, all documents, testimony and evidence are put in a searchable digital format, and if someone makes a conflicting statement compared to what is on the record, an alert or a similar effect is presented. In some embodiments, all of the searchable information is fact checked. In some embodiments, the fact checker performs a document reviewer's task. In some embodiments, legal arguments are fact checked to make sure a case is not cited out of context, a holding is not misstated, and/or any other checking.

In some embodiments, a language translator is implemented. For example, a video is translated from one language to another using closed caption. In another example, only mistakes are translated and displayed. In some embodiments, a foreign language monitor is implemented. For example, if a device knows a user's native language is English, and the user is attempting to speak Spanish, the device monitors for incorrect usage or pronunciation. In some embodiments, the device monitors every language for incorrect usage or pronunciation. For example, if a user says, "you played good today," the device is able to correct the user and indicate the sentence should have been, "you played well today." In some embodiments, the fact checker checks for outdated word use.

In some embodiments, if a comment is made about an individual, a group, a company or any other entity, that person is able to post a comment rebutting the comment on a different location than the original comment. Or the rebuttal is on the person's website and pulled, or tweeted, spoken, or any other means. For example, if Person A says Person B plans to raise taxes, the fact checking system is able to pull a quote from Person B's website that says, "I promise not to raise taxes," and that comment is automatically posted with Person A's comment, providing a real-time rebuttal. The rebuttal is able to be made/posted before the opposing comment is made for an immediate rebuttal. The location of the rebuttal is able to be found in any manner such as by determining the name of the person being commented on and finding the person's personal website (e.g. Facebook® page).

In some embodiments, the fact checker is used to prevent bullying on social networking sites including, but not limited to, Facebook®, Myspace, LinkedIn, Twitter, and other websites. For example, users are able to flag other poster's comments or pages as false or any other characterization. Additionally, as described above, an automatic rebuttal is able to be implemented such that if a user posts something on his site and then other users post a contradictory remark on their sites, the user's post is automatically used to rebut the other users' comments. For example, if a group of users try to disseminate a rumor about Teen X, Teen X is able to post a remark on his page that the rumor is not true. Then, when the group of users post their rumor on their sites, their comments will be marked on their sites, and they will be rebutted immediately, helping to dispel the rumor. The user is able to post his rebuttal proactively or after the other remarks are already made.

In some embodiments, real estate prices/values are fact checked. For example, if a real estate agent tells a person, "this house is worth $500,000," the fact checking system is able to take data regarding the house and do a real-time comparison with comparable sales (and other factors or specific information related to the house or the purchase including, but not limited to, household incomes, unemployment rates, population growth, upgrades, and others) and determine the validity of the agent's price. Other price comparison is able to be performed as well such as with tradespeople. For example, if a plumber quotes a person $100 to replace a pipe, the fact checking system is able to determine what other plumbers in the area charge for such a task and/or compare BBB ratings. In some embodiments, a rent checker is implemented. In some embodiments, other price comparison is performed including, but not limited to, comparison of stores, online goods/services or any other goods/services.

In an example of live fact checking, while a sporting event is being broadcast, a commentator provides commentary including statistics which are usually fed to the commentator by someone behind the scenes. To further ensure the accuracy of the comments, the fact checker is able to be implemented to monitor the data fed to the commentator before the commentator presents it or after the commentator makes the statement, so that he is able to make any corrections.

In some embodiments, a picture-in-picture configuration is used to provide information and results from the fact checking system to a user. In some embodiments, picture-in-picture is not used.

In some embodiments, the fact checking system is used to fact check archived data. For example, a network's past footage is fact checked. The results of the archived data are able to be used in rating the network or for other purposes.

In some embodiments, hypocrisy is detected. For example, statements are compared to source information to determine if previous statements contradict or are hypocritical. For example, Speaker A says, "we should do X" and then two weeks later, Speaker A says, "we should not do X," the second statement is indicated as hypocritical or flip-flopping. In some embodiments, the first statement is then displayed. Context is able to be implemented in conjunction with searching for hypocritical statements. For example, if Speaker A says, "adultery is wrong," but sources show that Speaker A previously committed adultery, an indication that Speaker A is being hypocritical is presented. Any other methods of determining hypocrisy are able to be implemented. Further, hypocrisy is able to be included with the validity rating of entities described herein. For example, when Speaker A appears on a television program, a label of hypocrite and/or a number of hypocritical statements/actions is presented. In some embodiments, dates or time frames are used in determining the relevance of fact check comparison. For example, if a hypocritical statement was made 30 years ago, the fact checker may realize that it was more likely a change of view rather than a hypocritical statement; whereas, a contradictory statement made 2 weeks ago is likely due to hypocrisy not a change of view. In some embodiments, items similar to hypocrisy including, but not limited to, flip-flopping and waffling are detected. In some embodiments, dates of when the conflicting (e.g. hypocritical) statements/actions occurred are displayed. Contradictions and other similar items are able to be determined in any manner, including, but not limited to, logic comparisons. For example, sentences with and without "not" are compared. In another example, detecting antonyms is used. In another example, a data structure (e.g. database) of quotes is kept and the quotes are classified (e.g. pro-tax), and if quotes by the same entity are on opposite classifications, hypocrisy is determined. Furthering the example, a commentator says we should attack Country A, which is classified as pro-war with Country A, and then later the commentator says we should not attack Country A, which is classified in an opposing cell as anti-war with Country A, hypocrisy is detected and indicated. In some embodiments, a database of potentially hypocritical statements/actions is maintained and monitored for contradictions. For example, the database includes names/entities and corresponding statements that are most ripe for hypocrisy (e.g. positions on adultery, wasting money, other political positions).

In some embodiments, subscriptions are implemented. Subscriptions are able to be implemented to perform any variety of subscription services. For example, users are able to subscribe to or unsubscribe to fact checking being displayed on their television screen. In some embodiments, users are able to subscribe to different levels of fact checking. In some embodiments, users are able to select preferences and/or settings for the extent of or quantity of items to be fact checked.

In some embodiments, the fact checker is used with rating websites including, but not limited to, yelp.com to ensure the comments/reviews by users are accurate. For example, if a user states that Business X is the worst in State Z, but Business X is not even in State Z, the comment is able to be filtered.

In some embodiments, the fact checker is used for fact checking sports' rules and the implementation of the rules. For example, the fact checker is used for determining if the umpire/referee made the correct call. The fact checker is able to analyze video or images of the sport, determine the applicable rule, analyze the facts and the rule, and produce a judgment. In some embodiments, the fact checker is used to fact check personal information. For example, a potential employer uses the fact checker to fact check potential employees' resumes. The fact checker is able to take portions of the person's resume and compare the person's education with education records, previous job history with company information, Bar information with public legal databases, and any other information. In another example, a mortgage company uses the fact checker to fact check a potential borrower's mortgage application. In yet another example, a dating service uses the fact checker to fact check people's postings. In another example, health information is checked, and to verify that a person qualifies for life insurance, the person's application is fact checked based on medical records. The fact checker is able to be used based solely on what is in a person's document (e.g. resume) or based on other information as well. For example, in some embodiments, a person's name is able to be used to locate supplemental information regarding the person. For example, the person's web page, Facebook® page, previous papers/articles written and any other information is able to be found to supplement the information provided. In some embodiments, only public information is searched, in some embodiments, only private information is searched, and in some embodiments, both public and private information is searched.

In some embodiments, the fact checker is able to be used to provide details regarding a physical object. For example, if a user takes a picture of a painted wall, the fact checker is able to determine the color, brand, type and/or any other information about the paint by database, based on date, location and any other information. In another example, the physical object determination is able to be used for learning, such that a person is able to take a picture of an object and the fact checker provides information about the object. For example, a child takes a picture of a cat, and the fact checker tells the child that it is a cat and that the cat is gray. In some embodiments, additional information is provided including, but not limited to, history of cats, anatomy of cats, and any other information. In some embodiments, the user takes a picture and then inputs (e.g. voice input) what the user thinks the object is, then the fact checker determines if the user is correct. For example, a child takes a picture of a cat and says, "dog," the fact checker will determine that the object is a cat and inform the user of that he is wrong and/or provide the correct answer. In some embodiments, a game is played using the fact checker where after the user takes the picture, the fact checker asks a question about the object. For example, a child takes a picture of the cat, and a question of what color the cat is, is presented. The fact checker then analyzes the response and responds accordingly. More difficult questions are able to be asked as well, such as historical questions (e.g. which group worshipped cats?), geography questions (e.g. what country has the most cats?), and/or mathematical questions (e.g. how many trees do you see in this scene?). In some embodiments, the questions become progressively more difficult as the user answers correctly. In some embodiments, the information acquired when taking pictures is organized in a report format. For example, if a student is supposed to do a report on different types of trees, and the student takes pictures of 5 different trees, a report, including the pictures, is generated with details about the trees. In some embodiments, the user is able to take a picture of a food item, and recipes are generated that use that item. In some embodiments, the user is able to take a picture of a store (e.g. restaurant), and information about that store is presented including, but not limited to, user ratings/reviews, critic ratings/reviews, hours of operation, menu and/or a description of the store. In some embodiments, the user does not have to take a picture; rather, the user merely points the lens of the camera of the mobile device at the object, and the device is able to scan the object. The information provided about the object is able to be based on a database lookup, a search or any other implementation. In some embodiments, the user takes a picture or points the camera at a street sign, and a list of items (e.g. restaurants) is displayed in order of proximity, ratings and/or reviews, for example. In some embodiments, GPS or another locating mechanism is used for determining a user's location.

In some embodiments, users are given rewards, awards and/or prizes for participating with and/or contributing to the fact checker.

In some embodiments, a collection of incorrect predictions and/or statements and/or hypocrisy is maintained.

In some embodiments, a shortcut fact checker is implemented. The shortcut fact checker performs a shortcut fact check and indicates "likely true," "likely false" or another indication. The shortcut fact check is implemented by performing a search and based on the number of results, indicating "likely true" or "likely false." For example, if a search results in zero results or few results, "likely false" is indicated. If a search results in many results, "likely true" is indicated. In some embodiments, the shortcut fact checker uses reliability ratings to narrow sources used. In some embodiments, the result accuracy rating is used (e.g. only "likely true" if there are many results with an accuracy rating above a threshold).

In some embodiments, the fact checker is implemented to correct word pronunciation of any communication (e.g. of broadcast information). For example, people's names, geographic locations and any other words are able to be corrected. In some embodiments, the fact checker compares the sound clip with another sound clip. For example, a database of people's names is stored and when their name is spoken, the pronunciation is compared with the stored data in the database. For example, each player on a football team says his name, and it is recorded in a database, then, when a broadcaster says his name, if it is mispronounced, some form of action is taken including, but not limited to, playing the correct version to the user, playing the correct version to the broadcaster so that he is able to repeat it, playing a chime to the broadcaster, displaying a phonetic spelling to the users and/or the broadcaster, and/or any other indication. In some embodiments, the sound clip is converted into text, and then the text is compared with a pronunciation guide. In some embodiments, the fact checker is implemented to correct grammar of any communication (e.g. of broadcast information). For example, if a commentator says, "I'm doing good," the grammar correction is able to correct the statement by indicating, "I'm doing well." The indication is able to be any indication; for example, sending a corrective Tweet to a user's mobile device.

In some embodiments, a lie detector is implemented with the fact checker. The lie detector analyzes a speaker's voice, body language, heart rate and/or any other information to determine if the person is telling the truth. For example, a video of a speaker is analyzed in conjunction with fact checking the content of the communication to provide a better assessment of the video. The lie detection analysis is able to be used to provide context to the fact checking analysis or vice versa.

In some embodiments, tracking is implemented. For example, words and/or phrases are tracked as a speech is displayed, throughout the speech or at the end of the speech, the number of repeats is displayed. For example, if the President says, "job creation" 5 times in a speech, that total is presented to the viewer. The information is also able to used for analysis of the speech (e.g. automatically determining the focus of the speech). In another example, words and/or phrases are tracked, and supplemental information is presented related to the tracked information. For example, if the President says, we need to "increase our energy independence," supplemental information is able to be shown to the viewer that the past 5 presidents have said the same or similar idea, and the viewer is able to understand that this may be a point with little substance. The phrases do not have to be verbatim matches; similar matches are able to be found.

In some embodiments, fact check information and/or supplemental information is displayed on a mobile device while the user is talking on the phone. For example, both sides of a user's phone conversation are being fact checked, and if something is detected as untrue, the fact checker indicates it to the user.

In some embodiments, user information is acquired to be used by the fact checker and/or supplemental information, for example, for advertising.

In some embodiments, information is presented in real-time, but also saved/stored so that the user is able to review the information later. The information is searchable, able to be categorized and/or organized/formatted in any manner.

In some embodiments, the date/time of a comment is recorded and/or determined. For example, if one entity begins a trend by saying a catchy phrase, and then other entities repeat the phrase making it out to be their original idea, a note is able to be presented giving credit to the first entity. Comparisons of dates/times or other implementations are able to be used in determining the first entity versus subsequent entities.

In some embodiments, the fact checker is able to detect changed names. For example, high fructose corn syrup is being changed to corn sugar. By detecting changed names, either name is able to be used in the fact check or to provide supplemental information. For example, if a person makes a comment about "corn sugar," the fact checker knows to search for "corn sugar" as well as "high fructose corn syrup." The implementation could be by using a database which stores name changes and searches based on all known names, or by using an embedded search to search for other names, or any other implementation.

In some embodiments, artificial intelligence is used in any aspect of the methods and systems described herein. For example, artificial intelligence is used to determine which follow-up question to ask a guest on a television show.

In some embodiments, the fact checker is used with teleprompters and/or to fact check scripts prior to airing. In some embodiments, the fact checker implements measures to prevent hacking, skewing and/or other tampering of the system.

In some embodiments, the fact checker is linked to or is a part of a gaming system.

In some embodiments, an independent fact checker device is implemented where the device receives information (e.g. a television signal) without the television being on and is able to perform monitoring, searching, analysis, and/or any other tasks.

In some embodiments, one or more of the data structures described herein are populated automatically, (e.g. by automatically searching and storing results in the data structure), manually, or a combination thereof.

In some embodiments, a scam checker is implemented using the fact checker. In some embodiments, the scam checker checks websites and/or emails to determine if they are safe. In some embodiments, the scam checker determines if an advertisement is a scam (dishonest scheme or fraud). In some embodiments, a scam is detected using a database of scams. For example, content (e.g. of a website) is compared with language in a database. In some embodiments, a scam is detected by determining it is similar to other scams. In some embodiments, a scam is detected by determining it is mathematically or economically impossible. In some embodiments, a scam is detected by determining the content includes misinformation. In some embodiments, a scam is detected by searching other website and/or weblogs that have commented on the scam. In some embodiments, a user is able to request a website to be fact checked by inputting a URL in a user interface of the fact checker. Any implementation is able to be used to detect a scam. In some embodiments, a scam website is indicated as such when displayed in a search engine result or other webpage (e.g. bubble when mouse over link).

Medical

In some embodiments, a medical fact checker is implemented. The medical fact checker monitors, processes, fact checks and indicates information. In some embodiments, the fact checker checks the information with a limited set of sources (e.g. validated medical sources). For example, in some embodiments, only medical journals and studies are used as sources for fact checking. In some embodiments, other sources are used, but the sources are still certified as valid before being used. In some embodiments, additional sources are used such as medical websites. In some embodiments, a designated medical database is used as a source. For example, a database of all known illnesses and symptoms is utilized as a source. In some embodiments, users are able to specify their threshold for sources to use. The medical fact checker is able to be utilized in various implementations. In some embodiments, a user inputs (e.g. says or types), "I think I have X disease, because I have symptoms A, B, and C." The medical fact checker fact checks the statement by looking up the disease and symptoms for the disease to see if the symptoms match the disease. In some embodiments, statistics are determined and indicated to the user. In some embodiments, additional information about the person is utilized to assist in performing the medical fact check, including, but not limited to, age, weight, height, race, previous conditions, time of the year, location, genetic conditions, family history, vaccinations, recent activities, recent travels, and any other information. For example, if the user says, "I think I have Polio because I have a fever and a headache," the medical fact checker indicates a 0.0001% chance of Polio based on recent diagnosis rates and/or any other data. In some embodiments, the medical fact checker indicates possible illnesses/conditions based on the symptom(s). For example, a list of possible illnesses/conditions is presented. In some embodiments, information is displayed to indicate that the listed illnesses/conditions include some symptoms described but not others.

In some embodiments, the medical fact checker prevents misinformation from being spread by fact checking email, websites, broadcast information and any other information. The fact checker compares the information with medical journals and/or other medical information to determine the validity of the information. For example, an email discussing homeopathic remedies is fact checked and/or to provide supplemental information about the remedies (e.g. what plant the remedy comes from, where it is located, any tests or studies done with the remedy, if the remedy is FDA approved, and other information). For further example, medical analysis is presented regarding the remedy. In some embodiments, it is determined if the medical information is stale and/or if a newer study has been performed. In some embodiments, information about the source of the information is fact checked and/or supplemental information presented. For example, the doctor's credentials are displayed (and fact checked), the medical school's information is displayed, certifications are fact checked and displayed, study information is displayed, any criminal charges, complaints and/or comments are displayed and/or any other information is displayed. In some embodiments, a database is implemented to track deceptive/false/fake medicine, doctors and/or medical information. In some embodiments, an email, website and/or other content is analyzed to determine if an item is being sold. For example, an email is distributed about being tired, and at the end of the email is an item to cure tiredness. The sales pitch is highlighted or indicated in a manner to alert the user of possible misinformation or medical scam.

In some embodiments, the fact checker checks for allergy information of items. For example, a device acquires allergy information by scanning the ingredients label, taking a picture of the ingredients label, using a barcode reader to determine the ingredients information, using RFID information, and/or any method of determining the ingredients and/or food preparation information (including, but not limited to, "processed in a plant that also processes X"). The fact checker then compares the information to a database of allergy information. In some embodiments, the fact checker uses a higher level approach and fact checks the allergy information by the name of the item. Any other implementation of fact checking the item for allergy information is able to be used to assist a user in avoiding allergic reactions, such as postings on a website or statements a company has made about a product in a FAQ, blog, or other location. Analysis such as fact checking is able to be done to determine the reliability of the posting; for example, a blogger receives a reliability or credibility rating.

Utilizing the fact checking system, method and device depends on the implementation to some extent. In some implementations, a word processor uses fact checking to assist a user in preparing a document, a television broadcast uses fact checking to fact check what is said or shown to the viewers, and a mobile application, in some embodiments, uses fact checking to ensure a user provides factually correct information. The fact checking is able to be implemented without user intervention. For example, if a user is watching a news program, the fact checking is able to automatically occur and present the appropriate information. In some embodiments, users are able to disable the fact checking if desired. Similarly, if a user implements fact checking on his word processor or mobile application, the fact checking occurs automatically. For a news company, the fact checking is also able to be implemented automatically, so that once installed and/or configured, the news company does not need take any additional steps to utilize the fact checking. In some embodiments, the news company is able to take additional steps such as adding sources. In some embodiments, news companies are able to disable the fact checking, and in some embodiments, news companies are not able to disable the fact checking to avoid tampering and manipulation of data. In some embodiments, one or more aspects of the fact checking are performed manually.

In operation, the fact checking system, method and device enable information to be fact checked in real-time and automatically (e.g. without user intervention). The monitoring, processing, fact checking and indicating of status are each able to occur automatically, without user intervention. Results of the fact checking are able to be presented nearly instantaneously, so that viewers of the information are able to be sure they are receiving accurate and truthful information. Additionally, the fact checking is able to clarify meaning, tone, context and/or other elements of a comment to assist a user or viewer. By utilizing the speed and breadth of knowledge that comes with automatic, computational fact checking, the shortcomings of human fact checking are greatly overcome. With instantaneous or nearly instantaneous fact checking, viewers will not be confused as to what information is being fact checked since the results are posted instantaneously or nearly instantaneously versus when a fact check is performed by humans and the results are posted minutes later. The rapid fact checking provides a significant advantage over past data analysis implementations. Any of the steps described herein are able to be implemented automatically.
Examples of Implementation Configurations:

Although the monitoring, processing, fact checking and indicating are able to occur on any device and in any configuration, these are some specific examples of implementation configurations. Monitoring, processing, fact checking and indicating all occur on a broadcaster's devices (or other emitters of information including, but not limited to, news stations, radio stations and newspapers). Monitoring, processing and fact checking occur on a broadcaster's devices, and indicating occurs on an end-user's device. Monitoring and processing occur on a broadcaster's devices, fact checking occurs on a broadcaster's devices in conjunction with third-party devices, and indicating occurs on an end-user's device. Monitoring occurs on a broadcaster's devices, processing and indicating occur on an end-user's device, and fact checking occurs on third-party devices. Monitoring, processing, fact checking, and indicating all occur on third-party devices. Monitoring, processing, fact checking, and indicating all occur on an end-user's device. These are only some examples; other implementations are possible. Additionally, supplemental information is able to be monitored for, searched for, processed and/or indicated using any of the implementations described herein.

Fact checking includes checking the factual accuracy and/or correctness of information. The type of fact checking is able to be any form of fact checking such as checking historical correctness/accuracy, grammatical correctness/accuracy, geographical correctness/accuracy, mathematical correctness/accuracy, scientific correctness/accuracy, literary correctness/accuracy, objective correctness/accuracy, subjective correctness/accuracy, and/or any other correctness/accuracy. Another way of viewing fact checking includes determining the correctness of a statement of objective reality or an assertion of objective reality. Yet another way of viewing fact checking includes determining whether a statement, segment or phrase is true or false.

Although some implementations and/or embodiments have been described related to specific implementations and/or embodiments, and some aspects/elements/steps of some implementations and/or embodiments have been described related to specific implementations and/or embodiments, any of the aspects/elements/steps, implementations and/or embodiments are applicable to other aspects/elements/steps, implementations and/or embodiments described herein.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory memory of a device comprising:
   a. automatically fact checking an email to determine a factual accuracy of the email by comparing, with the device, the email with source information, wherein fact checking occurs after the email is sent; and
   b. automatically indicating a status of the email based on a result of the comparison of the email with the source information.

2. The method of claim 1 further comprising marking the email such that factually inaccurate statements are indicated.

3. The method of claim 1 wherein the email is indicated as spam if the email is factually inaccurate.

4. The method of claim 3 wherein the email is determined to be factually inaccurate if a number of factual inaccuracies in the email exceeds a threshold.

5. The method of claim 1 wherein the source information comprises a plurality of sources, and each source of the plurality of sources has a reliability rating based on the accuracy of information within each source of the plurality of sources, wherein the accuracy is determined based on previous fact checking results, wherein a first source with a first reliability rating is given more weight during fact checking than a second source with a second reliability rating lower than the first reliability rating, wherein each source of the plurality of sources with the reliability rating below a threshold is not used in fact checking.

6. The method of claim 1 wherein the source information comprises a plurality of sources, and each source of the plurality of sources has a reliability rating.

7. The method of claim 6 wherein the reliability rating is based on the accuracy of information within a source.

8. The method of claim 6 wherein a first source with a high reliability rating is given more weight during fact checking than a second source with a lower reliability rating.

9. The method of claim 6 wherein a source with the reliability rating below a reliability threshold is not used in fact checking.

10. The method of claim 9 wherein the reliability threshold is a user-specified threshold.

11. The method of claim 6 wherein the reliability rating is based on previous fact checking results.

12. The method of claim 6 wherein the reliability rating is determined by an impartial organization.

13. The method of claim 6 wherein the reliability rating is determined by users.

14. The method of claim 1 wherein fact checking includes analyzing causation within the email.

15. The method of claim 1 wherein the source information comprises user-selected sources for fact checking.

16. The method of claim 15 wherein sources of the source information are clustered to enable selecting of a cluster of sources to be used for fact checking.

17. The method of claim 1 wherein sources of the source information are selected based on characteristics of each source.

18. The method of claim 1 wherein fact checking occurs when the email is opened.

19. A method programmed in a non-transitory memory of a device comprising:
   a. automatically receiving, with the device, a fact check result based on a comparison of email content with source information, wherein fact checking occurs after the email is sent; and
   b. automatically providing the fact check result through an email system indicating the factual accuracy of the email content.

20. A device comprising:
   a memory for storing an application for performing the following steps:
      i. fact checking an email by comparing the email with source information, wherein fact checking begins based on a user input, further wherein fact checking occurs after the email is sent;
      ii. indicating a status of the email based on a result of the comparison of the email with the source information; and
      iii. marking the email such that factually inaccurate statements are indicated; and
   b. a processor for processing the application.

* * * * *